US011452157B2

(12) United States Patent
Laselva et al.

(10) Patent No.: US 11,452,157 B2
(45) Date of Patent: Sep. 20, 2022

(54) COMMUNICATION CONNECTION CONTROL IN A NON-HOMOGENOUS NETWORK SCENARIO

(71) Applicant: Nokia Technologies Oy, Espoo (FI)

(72) Inventors: Daniela Laselva, Klarup (DK); Ahmad Awada, Munich (DE); Simone Redana, Munich (DE); Ingo Viering, Munich (DE); Muhammad Naseer-Ul-Islam, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/266,213

(22) PCT Filed: Aug. 9, 2018

(86) PCT No.: PCT/EP2018/071693

§ 371 (c)(1),
(2) Date: Feb. 5, 2021

(87) PCT Pub. No.: WO2020/030278

PCT Pub. Date: Feb. 13, 2020

(65) Prior Publication Data

US 2021/0266999 A1 Aug. 26, 2021

(51) Int. Cl.

*H04W 76/15* (2018.01)
*H04W 36/14* (2009.01)

(Continued)

(52) U.S. Cl.

CPC ........... *H04W 76/15* (2018.02); *H04W 36/14* (2013.01); *H04W 48/16* (2013.01); *H04W 72/04* (2013.01)

(58) Field of Classification Search

CPC . H04W 76/15; H04W 36/0069; H04W 76/27; H04W 88/06; H04W 36/14;

(Continued)

(56) References Cited

U.S. PATENT DOCUMENTS 11,240,700 B2 * 2/2022 Han ...................... H04W 48/08
2015/0271761 A1 * 9/2015 Park .................... H04W 52/146
370/329

(Continued)

FOREIGN PATENT DOCUMENTS

KR 20180107649 A * 10/2018 ............ H04L 47/40
WO WO 2017/118489 A1 7/2017
WO WO-2017222324 A1 * 12/2017

OTHER PUBLICATIONS

3GPP TSG-RAN WG2 Meeting #96, Reno, Nevada, Nov. 14-18, 2016, R2-168564, "0ms mobility interruption in NR", Huawei, HiSilicon, 6 pgs.

(Continued)

*Primary Examiner* — Allahyar Kasraian
(74) *Attorney, Agent, or Firm* — Harrington & Smith

(57) ABSTRACT

An apparatus for use by a first communication network control element configured to control a communication connection of at least one communication element in a first network area providing a specific communication capability, the apparatus including processing circuitry, and memory for storing instructions to be executed by the processing circuitry, wherein the memory and the instructions are configured to, with the processing circuitry, cause the apparatus at least: to determine that a communication element communicating in the first network area and using the specific communication capability enters a second network area which does not provide the specific communication capability and that there is a switching of the communication connection to the second network area, and to cause sending of connection switching information related to the switching of the communication connection of the communication element to a second communication network control element.

24 Claims, 13 Drawing Sheets

(51) Int. Cl.
*H04W 48/16* (2009.01)
*H04W 72/04* (2009.01)

(58) Field of Classification Search
CPC . H04W 48/16; H04W 72/0446; H04W 88/10; H04W 36/0066; H04W 36/06
See application file for complete search history.

(56) References Cited

U.S. PATENT DOCUMENTS

| | | | | |
|---|---|---|---|---|
| 2016/0157293 | A1* | 6/2016 | Pazhyannur | H04W 76/27<br>370/329 |
| 2016/0219604 | A1* | 7/2016 | Fujishiro | H04W 36/04 |
| 2016/0242080 | A1* | 8/2016 | Vikberg | H04W 76/15 |
| 2017/0127331 | A1* | 5/2017 | Wu | H04W 76/27 |
| 2018/0176974 | A1* | 6/2018 | Fujishiro | H04L 5/001 |
| 2018/0324663 | A1* | 11/2018 | Park | H04W 36/38 |
| 2018/0352491 | A1* | 12/2018 | Shih | H04W 36/14 |
| 2018/0368140 | A1* | 12/2018 | Centonza | H04W 72/0426 |
| 2019/0124708 | A1* | 4/2019 | Shi | H04W 88/10 |
| 2019/0289510 | A1* | 9/2019 | Rugeland | H04W 36/0069 |
| 2020/0389823 | A1* | 12/2020 | Xu | H04W 76/20 |
| 2021/0298104 | A1* | 9/2021 | Akiyoshi | H04W 76/16 |

OTHER PUBLICATIONS

3GPP TSG-RAN WG3 AH, Spokane, Washington, USA, Jan. 17-19, 2017, R3-170223, “RAN Support of Slice Availability”, Huawei, 2 pgs.

3GPP TSG-RAN WG3 #95bis, Spokane, WA, USA, Apr. 3-7, 2017, R3-171143, “Slice re-mapping or removal during mobility” Ericsson, 5 pgs.

3GPP TSG-RAN WG3 95bis, Spokane, Washington, USA, Apr. 3-7, 2017, R3-171251, “Further Discussion on Slice-Re-Mapping”, Huawei, 7 pgs.

3GPP TSG RAN WG3#98, Reno, USA, 27-1 Nov/Dec. 2017, R3-174297, 3GPP TSG RAN WG3#97bis, Prague, Czech, Oct. 9-13, 2017, R3-173469, “Correction of TS37.340 for NW Slice”, ZTE, 4 pgs.

* cited by examiner

COMMUNICATION CONNECTION CONTROL IN A NON-HOMOGENOUS NETWORK SCENARIO

CROSS REFERENCE TO RELATED APPLICATION

This patent application is a U.S. National Stage application of International Patent Application Number PCT/EP2018/071693 filed Aug. 9, 2018, which is hereby incorporated by reference in its entirety.

BACKGROUND

Field

Examples of embodiments relate to apparatuses, methods, systems, computer programs, computer program products and (non-transitory) computer-readable media usable for conducting a communication connection control of a communication element or function, such as a UE, being in a non-homogenous network environment, and in particular to apparatuses, methods, systems, computer programs, computer program products and (non-transitory) computer-readable media usable for controlling a switch like a handover of a communication connection of a communication element or function or a re-establishment of the communication connection of the communication element or function located in a non-homogenous network when the involved network areas such as cells have differing communication capabilities or functions.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:

3GPP 3rd Generation Partner Project
4G fourth generation
5G fifth generation
BS base station
CA carrier aggregation
CN core network
CPU central processing unit
DC dual connectivity
DRB data radio bearer
EN E-UTRAN-NR
E-UTRAN evolved UMTS terrestrial radio access network
eMBB enhanced mobile broadband
eNB evolved node B
ETSI European Telecommunications Standards Institute
gNB next generation node B
HO handover
ID identification
IE information element
LTE Long Term Evolution
LTE-A LTE Advanced
LWA LTE WiFi aggregation
MAC medium access control MC multi connectivity
MCG master cell group
MEC mobile edge computing
MgNB master gNB
MNO mobile network operator
NG new generation
NR new radio
NSSAI network slice selection assistance information
PDCP packet data control protocol
PDU packet data unit
PLMN public land mobile network
QoS quality of service
RACH random access channel
RAN radio access network
RAT radio access technology
RLF radio link failure
RNI radio network information
RRC radio resource control
sA-UE UE using slice A
SCG secondary cell group
SD slice differentiator
SgNB secondary gNB
SLA service level agreement
SRB signaling radio bearer
SST slice service type
TTT time to trigger
UE user equipment
UMTS universal mobile telecommunication system
UPF user plane function
URLLC ultra reliable low latency communication

SUMMARY

According to an example of an embodiment, there is provided, for example, an apparatus for use by a first communication network control element or function configured to control a communication connection of at least one communication element or function in a first network area providing a specific communication capability or function, the apparatus comprising at least one processing circuitry, and at least one memory for storing instructions to be executed by the processing circuitry, wherein the at least one memory and the instructions are configured to, with the at least one processing circuitry, cause the apparatus at least: to determine that a communication element or function communicating in the first network area and using the specific communication capability or function enters a second network area which does not provide the specific communication capability or function and that there is a switching of the communication connection to the second network area, and to cause sending of connection switching information related to the switching of the communication connection of the communication element or function to a second communication network control element or function configured to control a communication connection of the communication element or function in the second network area, wherein the information comprises a communication capability search mode indication for informing the second communication network control element or function to set the communication element or function into a communication capability search mode in which a connected mode of the communication element or function is maintained and a further switching of the communication connection to another network area providing the specific communication capability or function is accelerated.

Furthermore, according to an example of an embodiment, there is provided, for example, a method for use in a first communication network control element or function configured to control a communication connection of at least one communication element or function in a first network area providing a specific communication capability or function, the method comprising determining that a communication element or function communicating in the first network area and using the specific communication capability or function enters a second network area which does not provide the specific communication capability or function and that there is a switching of the communication connection to the second network area, and causing sending of connection switching information related to the switching of the communication connection of the communication element or function to a second communication network control element or function configured to control a communication connection of the communication element or function in the second network area, wherein the information comprises a communication capability search mode indication for informing the second communication network control element or function to set the communication element or function into a communication capability search mode in which a connected mode of the communication element or function is maintained and a further switching of the communication connection to another network area providing the specific communication capability or function is accelerated.

According to further refinements, these examples may include one or more of the following features:

- the connection switching information comprising the communication capability search mode indication may be sent when a handover of the communication element or function from the first network area to the second network area is to be conducted, or when a radio link failure indication for the communication element or function is received from the second communication network control element or function; and
- the connection switching information comprising the communication capability search mode indication may comprise at least one of an indication of the specific communication capability or function used by the communication element or function which is to be searched for the further switching of the communication connection to another network area, information identifying candidate neighboring network areas providing the specific communication capability or function, information indicating measurement settings for searching network areas providing the specific communication capability or function, timer information indicating a timing for which the communication element or function is to be kept in the communication capability search mode and when a communication connection to the communication element or function can be released, information indicating a prioritizing of network areas providing the specific communication capability or function, an indication whether the communication element or function requires service continuity after switching the communication connection to the second network area, an indication of a quality of service level provided in a communication connection of the communication element or function in the second network area, and an indication of a quality of service level provided in a communication connection of the communication element or function when using the specific communication capability or function.

Furthermore, according to an example of an embodiment, there is provided, for example, an apparatus for use by a second communication network control element or function configured to control a communication connection of at least one communication element or function in a second network area which does not provide a specific communication capability or function, the apparatus comprising at least one processing circuitry, and at least one memory for storing instructions to be executed by the processing circuitry, wherein the at least one memory and the instructions are configured to, with the at least one processing circuitry, cause the apparatus at least: to determine a connection switching of a communication connection to the second network area by a communication element or function using the specific communication capability or function in the first network area, to obtain and process connection switching information related to a switching of the communication connection of the communication element or function from a first communication network control element or function configured to control a communication connection of the communication element or function in the first network area, wherein the information comprises a communication capability search mode indication for informing to set the communication element or function into a communication capability search mode in which a connected mode of the communication element or function is maintained and a further switching of the communication connection to another network area providing the specific communication capability or function is accelerated, and to configure the communication element or function for a communication connection in the second network area on the basis of the connection switching information comprising the communication capability search mode indication.

Furthermore, according to an example of an embodiment, there is provided, for example, a method for use in a second communication network control element or function configured to control a communication connection of at least one communication element or function in a second network area which does not provide a specific communication capability or function, the method comprising determining a connection switching of a communication connection to the second network area by a communication element or function using the specific communication capability or function in the first network area, obtaining and process connection switching information related to a switching of the communication connection of the communication element or function from a first communication network control element or function configured to control a communication connection of the communication element or function in the first network area, wherein the information comprises a communication capability search mode indication for informing to set the communication element or function into a communication capability search mode in which a connected mode of the communication element or function is maintained and a further switching of the communication connection to another network area providing the specific communication capability or function is accelerated, and configuring the communication element or function for a communication connection in the second network area on the basis of the connection switching information comprising the communication capability search mode indication.

According to further refinements, these examples may include one or more of the following features:

- the connection switching information comprising the communication capability search mode indication may be obtained in a handover request message from the first communication network control element or function when a handover of the communication element or function from the first network area to the second network area is to be conducted, or in response to a radio link failure indication for the communication element or function trying to re-establish a communication connection via the second network area;

the connection switching information comprising the communication capability search mode indication may comprise at least one of an indication of the specific communication capability or function used by the communication element or function which is to be searched for the further switching of the communication connection to another network area, information identifying candidate neighboring network areas providing the specific communication capability or function, information indicating measurement settings for searching network areas providing the specific communication capability or function, timer information indicating a timer providing a timing for which the communication element or function is to be kept in the communication capability search mode and when a communication connection to the communication element or function can be released, information indicating a prioritizing of network areas providing the specific communication capability or function, an indication whether the communication element or function requires service continuity after switching the communication connection to the second network area, an indication of a quality of service level provided in a communication connection of the communication element or function in the second network area, and an indication of a quality of service level provided in a communication connection of the communication element or function when using the specific communication capability or function.

the communication element or function may be informed about the communication capability search mode and to instruct the communication element or function to cancel requesting in the second network area for a service based on the specific communication capability or function;

it may be determined whether the timer is elapsed, it may be determined whether other services are required for the communication element or function, and the communication connection to the communication element or function may be released and the communication element or function may be set into an idle or inactive state in case the timer is elapsed and no other services are required;

when the communication connection to the communication element or function is released, support information may be forwarded to the communication element or function which is usable by the communication element or function in the idle or inactive state and indicates prioritized frequency layers of other network areas providing the specific communication capability of function;

the timer may be stopped when a further switching of the communication connection of the communication element or function to another network area providing the specific communication capability or function is conducted, or information indicating the timer value minus a dwelling time of the communication element or function in the second network area and information comprising at least a part of the connection switching information comprising the communication capability search mode indication may be forwarded to a corresponding communication network control element or function when a further switching of the communication connection of the communication element or function to another network area not providing the specific communication capability or function is conducted;

in case service continuity of the communication element or function is required, the communication element or function may be mapped to a communication capability or function provided by the second network area and to provide a downgraded service to the communication element or function;

the indication of the quality of service level provided in a communication connection of the communication element or function when using the specific communication capability or function may be stored, and the stored indication may be provided to a communication network control element or function of another network area when switching the communication connection of the communication element to the other network area;

a prioritized switching of the communication connection of the communication element or function to a network area providing the specific communication capability or function may be initiated under consideration of the information indicating the prioritizing of network areas providing the specific communication capability or function;

a prioritized switching of the communication connection of the communication element or function to a network area providing the specific communication capability or function may be initiated by configuring earlier handover measurements for neighboring network areas providing the specific communication capability or function and by configuring later handover measurement neighboring network areas not providing the specific communication capability or function.

Furthermore, according to an example of an embodiment, there is provided, for example, an apparatus for use by a communication element or function configured to establish a communication connection in a network area providing a specific communication capability or function, the apparatus comprising at least one processing circuitry, and at least one memory for storing instructions to be executed by the processing circuitry, wherein the at least one memory and the instructions are configured to, with the at least one processing circuitry, cause the apparatus at least: to receive and process, when a switching of communication connection from the first network area to a second network area which does not provide a specific communication capability or function is conducted, an indication that the communication element or function is set in a communication capability search mode in which a connected mode of the communication element or function is maintained and a further switching of the communication connection to another network area providing the specific communication capability or function is accelerated, and to cancel requesting in the second network area for a service based on the specific communication capability or function.

Furthermore, according to an example of an embodiment, there is provided, for example, a method for use in a communication element or function configured to establish a communication connection in a network area providing a specific communication capability or function, the method comprising receiving and processing, when a switching of communication connection from the first network area to a second network area which does not provide a specific communication capability or function is conducted, an indication that the communication element or function is set in a communication capability search mode in which a connected mode of the communication element or function is maintained and a further switching of the communication connection to another network area providing the specific communication capability or function is accelerated, and cancelling requesting in the second network area for a service based on the specific communication capability or function.

According to further refinements, these examples may include one or more of the following features:

- the indication that the communication element or function is set in a communication capability search mode may be received from a communication network control element or function of the first network area or from a communication network control element or function of the second network area;
- when the communication connection to the second network area is released, support information may be received and processed which is usable by the communication element or function in an idle or inactive state and indicates prioritized frequency layers of other network areas providing the specific communication capability of function, and a network area reselection processing may be conducted by using the support information.

Furthermore, according to an example of an embodiment, there is provided, for example, an apparatus for use by a first communication network control element or function configured to control a communication connection of at least one communication element or function in a first network area providing a specific communication capability or function, the apparatus comprising at least one processing circuitry, and at least one memory for storing instructions to be executed by the processing circuitry, wherein the at least one memory and the instructions are configured to, with the at least one processing circuitry, cause the apparatus at least: to determine that a communication element or function communicating in the first network area and using the specific communication capability or function enters at least one second network area which does not provide the specific communication capability or function and that a switching of the communication connection to the second network area is initiated, to cause sending of a request, to at least one second communication network control element or function configured to control a communication connection of the communication element or function in the at least one second network area, to conduct a switched mode for providing service continuity for the communication element or function using the specific communication capability or function by starting a dual or multi connectivity communication, wherein the switched mode involves that at least one split or switched bearer is established to the communication element or function by the at least one second communication network control element or function via which the communication element or function communicates with the network, and data traffic for the continued service using the specific communication capability or function is transmitted to or from the communication element of function from or to the first communication network control element or function via the at least one second communication network control element or function using the at least one split or switched bearer.

Furthermore, according to an example of an embodiment, there is provided, for example, a method for use in a first communication network control element or function configured to control a communication connection of at least one communication element or function in a first network area providing a specific communication capability or function, the method comprising determining that a communication element or function communicating in the first network area and using the specific communication capability or function enters at least one second network area which does not provide the specific communication capability or function and that a switching of the communication connection to the second network area is initiated, causing sending of a request, to at least one second communication network control element or function configured to control a communication connection of the communication element or function in the at least one second network area, to conduct a switched mode for providing service continuity for the communication element or function using the specific communication capability or function by starting a dual or multi connectivity communication, wherein the switched mode involves that at least one split or switched bearer is established to the communication element or function by the at least one second communication network control element or function via which the communication element or function communicates with the network, and data traffic for the continued service using the specific communication capability or function is transmitted to or from the communication element of function from or to the first communication network control element or function via the at least one second communication network control element or function using the at least one split or switched bearer.

According to further refinements, these examples may include one or more of the following features:

- when requesting the switched mode, a secondary cell addition preparation request may be sent to the at least one second communication network control element or function for setting up a dual or multi connectivity communication with the second communication network control element or function as a secondary cell, configuration information of the communication element or function related to the specific communication capability or function may be provided to the at least one second communication network control element or function, suitable resources for data traffic transmission via an interface between the first communication network control element or function and the second communication network control element or function may be prepared, and data packets may be transmitted between the communication element or function and a core network via the interface between the first communication network control element or function and the second communication network control element or function;
- when requesting the switched mode, a handover request may be sent to the second communication network control element or function including configuration information of the communication element or function related to the specific communication capability or function, and a request for providing service continuity by using dual or multi connectivity communication, a request may be received from the second communication network control element or function to configure a split or switched bearer for service continuity and processed, a split or switched bearer of the communication element or function with the second communication network control element or function acting as a master cell may be configured, and the communication element or function may be instructed to stop monitoring user and control planes of the first communication network control element or function, suitable resources for data traffic transmission via an interface between the first communication network control element or function and the second communication network control element or function may be prepared, and data packets may be transmitted between the communication element or function and a core network via the interface between the first communication network control element or function and the second communication network control element or function;

a validity timer indicating a timing when the dual or multi connectivity communication for providing service continuity is to be terminated in the at least one second network area may be set, and the validity timer may be provided to the at least one second communication network control element or function;

the switched mode may involve that the first communication network control element or function of the first network area is set as a master cell group and one second communication network control element or function of the at least one second network area is set as a secondary cell group, or that one second communication network control element or function of the second network area is set as a master cell group and the first communication network control element or function of first network area and other second communication network control elements or functions are set as a secondary cell group.

Furthermore, according to an example of an embodiment, there is provided, for example, an apparatus for use by a second communication network control element or function configured to control a communication connection of at least one communication element or function in a second network area which does not provide a specific communication capability or function, the apparatus comprising at least one processing circuitry, and at least one memory for storing instructions to be executed by the processing circuitry, wherein the at least one memory and the instructions are configured to, with the at least one processing circuitry, cause the apparatus at least: to receive and process, in case a communication element or function using the specific communication capability or function enters from a first network area providing the specific communication capability or function into the second network area and switching of the communication connection to the second network area is initiated, a request from a first communication network control element or function configured to control a communication connection of the communication element or function in the first network area to conduct a switched mode for providing service continuity for the communication element by starting a dual or multi connectivity communication, wherein the switched mode involves that at least one split or switched bearer is established to the communication element or function by the second communication network control element or function via which the communication element or function communicates with the network, and data traffic for the continued service using the specific communication capability or function is transmitted to or from the communication element of function from or to the first communication network control element or function via the second communication network control element or function using the at least one split or switched bearer.

Furthermore, according to an example of an embodiment, there is provided, for example, a method for use in a second communication network control element or function configured to control a communication connection of at least one communication element or function in a second network area which does not provide a specific communication capability or function, the method comprising receiving and processing, in case a communication element or function using the specific communication capability or function enters from a first network area providing the specific communication capability or function into the second network area and switching of the communication connection to the second network area is initiated, a request from a first communication network control element or function configured to control a communication connection of the communication element or function in the first network area to conduct a switched mode for providing service continuity for the communication element by starting a dual or multi connectivity communication, wherein the switched mode involves that at least one split or switched bearer is established to the communication element or function by the second communication network control element or function via which the communication element or function communicates with the network, and data traffic for the continued service using the specific communication capability or function is transmitted to or from the communication element of function from or to the first communication network control element or function via the second communication network control element or function using the at least one split or switched bearer.

According to further refinements, these examples may include one or more of the following features:

when requesting the switched mode, a secondary cell addition preparation request may be received from the first communication network control element or function for setting up a dual or multi connectivity communication with the second communication network control element or function as a secondary cell and processed, configuration information of the communication element or function related to the specific communication capability or function may be received from the first communication network control element or function and stored, suitable resources for data traffic transmission via an interface between the first communication network control element or function and the second communication network control element or function may be prepared, establishing a connection to a user plane function for the specific communication capability of function for avoiding a path switch may be prevented, the switched mode may be confirmed to the first communication network control element or function, communication resources via a radio interface towards the communication network or function for providing traffic data related to the specific communication capability or function may be reserved, and the data traffic of the communication element or function may be served by forwarding data packets between the communication element or function and a core network via the interface between the first communication network control element or function and the second communication network control element or function;

when requesting the switched mode, a handover request may be received from the first communication network control element or function including configuration information of the communication element or function related to the specific communication capability or function, and a request for providing service continuity by using dual or multi connectivity communication and processed, when service continuity can be supported, it may be responded to the handover request by transmitting a request to the first communication network control element or function to configure a split or switched bearer for service continuity a split or switched bearer with the communication element or function where the second communication network control element or function acting as a master cell may be established, suitable resources for data traffic transmission via an interface between the first communication network control element or function and the second communication network control element or function may be prepared, and the data traffic of the communication element or function may be served by forwarding data packets between the communication element or function and a core network via the interface between the first communication network control element or function and the second communication network control element or function;

information indicating a validity timer indicating a timing when the dual or multi connectivity communication for providing service continuity is to be terminated in the second network area may be received and processed, and the dual or multi connectivity communication with the communication element or function may be terminated when the timer expires by conducting a handover to the second communication network control element or function;

in case it is determined that the communication element or function enters from the second network area into another network area providing the specific communication capability of function, switching of the communication connection to the other network area may be initiated, configuration information of the communication element or function related to the specific communication capability or function may be provided to a communication network control element or function of the other network area, and the switched mode may be terminated when the switching of the communication connection to the other network area is completed;

a communication capability search mode indication for informing the second communication network control element or function to set the communication element or function into a communication capability search mode in which a further switching of the communication connection to another network area providing the specific communication capability or function is accelerated may be received from the first communication network control element or function and processed;

the switched mode may involve that the first communication network control element or function of the first network area is set as a master cell group and one second communication network control element or function of the at least one second network area is set as a secondary cell group, or that one second communication network control element or function of the second network area is set as a master cell group and the first communication network control element or function of first network area and other second communication network control elements or functions are set as a secondary cell group.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
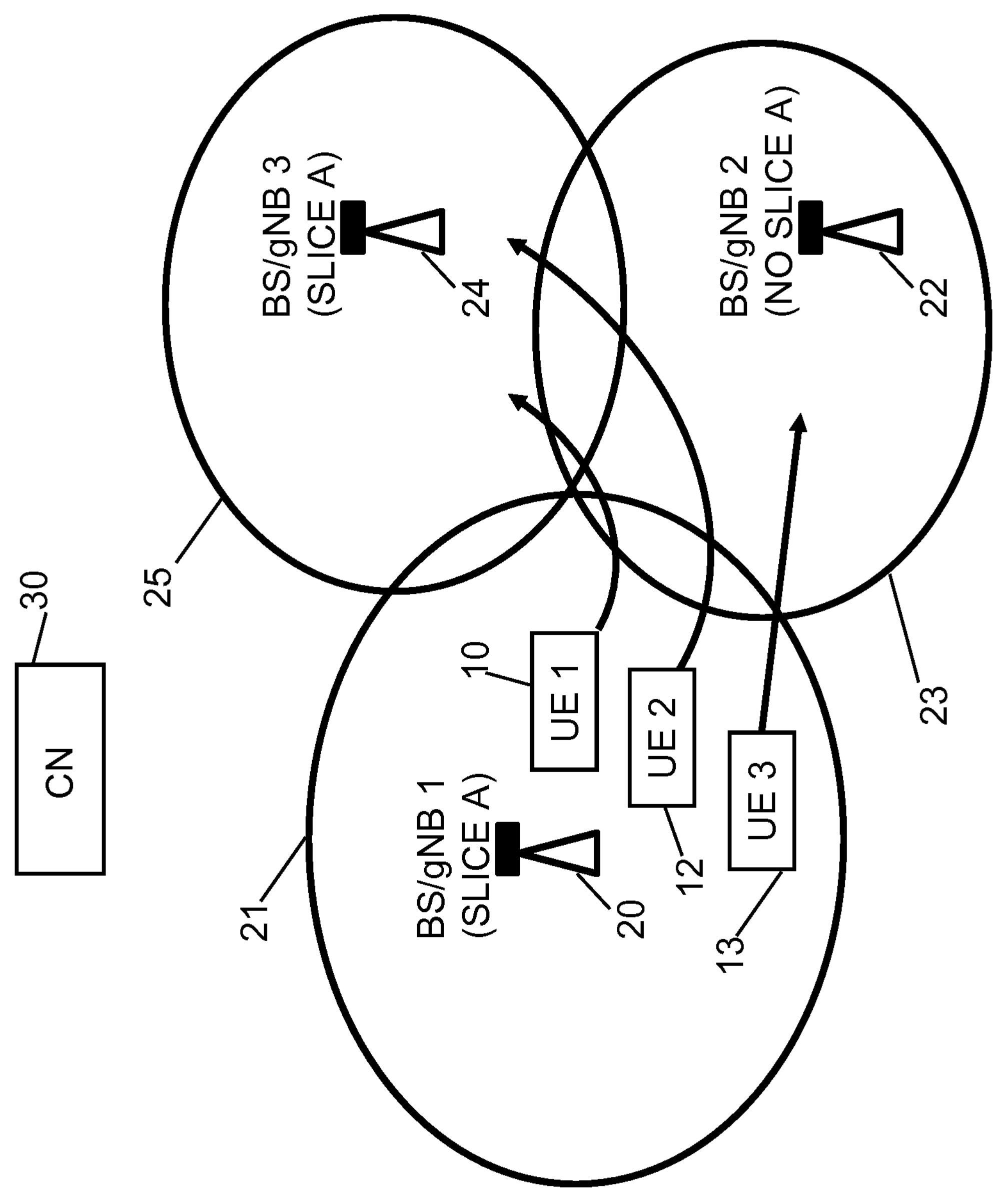
FIG. 1 shows a diagram illustrating an example of a non-homogenous network scenario.

In the last years, an increasing extension of communication networks, e.g. of wire based communication networks, such as the Integrated Services Digital Network (ISDN), DSL, or wireless communication networks, such as the cdma2000 (code division multiple access) system, cellular 3$^{rd}$ generation (3G) like the Universal Mobile Telecommunications System (UMTS), fourth generation (4G) communication networks or enhanced communication networks based e.g. on LTE or LTE-A, fifth generation (5G) communication networks, cellular 2$^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the 3$^{rd}$ Generation Partnership Project (3GPP), Telecoms & Internet converged Services & Protocols for Advanced Networks (TISPAN), the International Telecommunication Union (ITU), 3$^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Basically, for properly establishing and handling a communication between two or more end points (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

In new communication networks, such as networks based on 5G or later releases, a new concept called network slicing is employed. Network slicing forms so-called slices (i.e. communication capabilities) which allow a network operator to provide dedicated (virtual) networks with functionality specific to a service or customer over a common network infrastructure. This allows to support numerous and varied services envisaged e.g. in 5G and future systems, such as URLLC, eMBB etc.

Basically, network slicing allows multiple virtual networks to be created on top of a common shared physical infrastructure. The virtual networks are then customised to meet the specific needs of applications, services, devices, customers or operators.

However, it is possible that mobile communication systems (such as New Radio/5G or LTE) do not provide each slice or communication capability at each place or at each time. This results in a non-homogenous slice support, i.e. certain network slices are not supported in all network areas. For example, such network areas are respective cells which are controlled by a corresponding communication network control element or function, such as a gNB or eNB etc., wherein sizes and configurations of such network areas or cells are variable (e.g. macro cells, pico cells etc. are implementable).

Non-homogenous slice support may exist, for example, at a boundary of a restricted area where a slice or communication capability is supported, during an upgrade phase where cells are upgraded one by one with the new capability (e.g. slice support), when a network area or cell is entered which does not employ, for example, some dedicated features required for a service using the slice so that a resulting QoS is not completely in line with the slice's demands, or at connections between the CN and RAN of a cell which does not support the slice (i.e. backhaul restrictions).

For example, it is conceivable that a cell, irrespective of whether or not all features required for providing the slice in question are actually installed, is able to basically support the slice by its lower radio layers (e.g. by means of MAC scheduling). Nevertheless, it may happen that a cell cannot employ some dedicated features (e.g. for URLLC optimizations or the like), so that a QoS may not be completely in line with the slice's demands. Furthermore, required connections between the CN and RAN of the cell not supporting the slice, may be or may not be available.

Hence, unless such a communication capability or slice is supported in the whole network, measures are required which allow to deal with such a non-homogenous scenario.

According to some examples, a network slice is identified via a specific information, such as a NSSAI. For example, a communication element or function, such as a UE, can be connected and served by up to eight NSSAIs simultaneously, as per 3GPP Release 15, but there is basically no limit on the number of network slices that each cell may support. That is, a cell may support tens or even hundreds of S-NSSAIs.

An NSSAI includes, for example, a slice service type (SST) field and a slice differentiator (SD) field with a total length of 32 bits. It is also possible that the NSSAI includes only a SST field part in which case the length of the NSSAI is 8 bits only. The SST field may have standardized and non-standardized values. Values 0 to 127 belong to the standardized SST range. For instance, an SST value of 1 indicates that the slice is suitable for handling of 5G eMBB, an SST value of 2 indicates handling of URLLC, etc. It is to be noted that the SD field is operator-defined.

Another network or communication capability being employed in the recent years is MEC. MEC is an effective measure to reduce latency and incorporate intelligence and processing capacity at the edge of the mobile network. The MEC technology allows running contents and applications at RAN level, leveraging radio parameters referred to as Radio Network Information (RNI), and avoiding the long path usually experienced by the traffic when going through the Internet towards an applications server and back to the other end. Furthermore, it can also implement effective local caching strategies, local breakout, or artificial intelligence for those applications intended to run locally. However, because of its costs, it can be expected that the MEC will be deployed only at a limited number of RAN sites or cells, and its availability should be exploited at the largest extent. Hence, when a UE using MEC services is moving in the communication network, a non-homogenous scenario may occur as well.

In the following, it is assumed that there are network areas or cells supporting (or providing) a specific network or communication capability or function, such as MEC, a specific security scheme support, a slice support (referred to hereinafter also as "slice A"), and network areas or cells which do not support this specific network or communication capability or function, but other communication capabilities or functions offering another (possibly partially downgraded) service compared to the communication capability supporting cell (e.g. a default service or slice for a mobile network operator (MNO)). It is to be noted that in case reference is made to a "communication capability" or "slice" (e.g. "slice A") provided by a cell, basically equivalent services being available by this cell or network area are meant.

FIG. 1 shows a diagram for illustrating the non-homogenous scenario indicated above. Specifically, a simplified network part is shown in which three network areas or cells are shown. It is to be noted that the number of cells to be considered for a non-homogenous network deployment is variable.

In the following, it is assumed that cells of the network are operated by the same MNO. Furthermore, it is assumed that the cells are on the same frequency layer, but it is to be noted that examples of embodiments discussed in the following are not limited to such a configuration; instead examples being discussed below can be applied to cells which are on different frequency layers.

As shown in FIG. 1, it is assumed that cell 21 controlled by BS or gNB 1 20 and cell 25 controlled by BS of gNB 3 24 are cells providing a specific communication capability or slice, as described above (also referred to as slice A). On the other hand, a neighboring cell 23 controlled by BS or gNB 2 22 is a cell which does not provide this specific communication capability or function (e.g. MEC support) (or slice, e.g. slice A), so that a non-homogenous network scenario is present.

It is to be noted that reference sign 30 denotes a core network CN of the communication network with which the gNBs 20, 22 and 24 are connected and which provides, for example, a link to other networks, such as the Internet. However, it is to be noted that examples of embodiments discussed later are also applicable to cases where the respective communication network control elements or functions, i.e. the source and the target for a possible connection switch like a handover, belong to different networks of the same type (e.g. cellular telecommunication networks) of different types (e.g. cellular communication network and WLAN or the like). Furthermore, it is to be noted that examples of embodiments includes a communication switch in a case where a connection to one communication network control element or function (e.g. the gNB 20) is maintained and a further connection is established to another communication network control element or function (e.g. the gNB 22), i.e. in case of a dual or multi-connectivity communication connection or in case of a multi-RAT communication connection.

For the sake of completeness, all cells 21, 23, and 25 support a default communication capability or slice of the network operator, which is referred to hereinafter also as MNO slice. For example, it is assumed that services of the slice A cannot be fully mapped to the MNO slice, so that a UE using this slice A would experience at least some service degradation if its connection is mapped to the default MNO slice by the network.

In theory, when a UE is using a specific communication capability (e.g. a service of slice A) (also referred to as a sA-UE), this sA-UE should move predominantly in network areas where the slice A can be provided, i.e. in cells 21 and 25 which support slice A. However, it cannot be fully avoided that a sA-UE will leave the network area where the slice A is available, i.e. that it leaves the cells 21 and 25 and enters (only) cell 23. For illustrating possible scenarios in this case, three UEs are shown, i.e. UE 1 10, UE 2 12 and UE 3 13 following different ways in the network (indicated by corresponding arrows). It is to be noted that all three UEs shown in FIG. 1 are assumed to be sA-UEs, i.e. using services of a specific communication capability of function (e.g. slice A) in cell 21.

It is to be noted that in the following the term "connection switching" or "switch of a communication connection" refers to various types of changes in the connection of a communication element or function (e.g. a UE) in the network. For example, a handover from a source cell to a target cell, an establishment or re-establishment of a communication connection to a cell (e.g. after losing contact to the network due to a RLF or the like), and a change of the connection type, e.g. from a single connectivity connection to a dual or multi connectivity connection involving a plurality of network areas or cells in the connection to the UE are related to a "connection switching" or the like in the following specification. Furthermore, it is to be noted that the term "connection switching" or "switch of a communication connection" is not related to the point of time where this switch (e.g. handover) is completed but to the time where such a switch is initiated or started, e.g. from the network in case of a handover or from the UE in case of a re-establishment procedure.

As shown in FIG. 1, UE 1 10 leaves the cell 21 only very shortly before entering cell 25. In this case, discontinuity of the slice A service might be avoided by postponing a connection switch (e.g. handover) to cell 25 and/or by preferring a handover to cell 25. This can be achieved with fine-adjusting corresponding handover thresholds within limits given by mobility robustness optimization (similar to mobility load balancing). Obviously, there is a risk of connection failures, such as a radio link failure (RLF).

UE 2 12 is assumed to completely leave network area supporting the slice A (i.e. cell 21), but it returns later to cell 25. Here, discontinuity of the slice A service cannot be avoided. That is, UE 2 12 cannot be kept in cell 21, but it is also not possible that cell 21 conducts a handover with cell 25 for UE 2 11 directly. For example, an interference from cell 23 would lead to a radio link failure or a handover failure. On the other hand, a handover to cell 23 leads to service discontinuity since the UE 2 12 can only use the MNO slice. Since the UE 2 12 can resume the service in cell 25 later on, it is preferred to allow the resumption as quickly as possible, and with as little overhead as possible.

UE 3 13, on the other hand, completely leaves the network area providing the slice A for a longer time. In this case, it is preferred to terminate the slice A service.

However, neither the network nor the sA-UEs are able to know at the moment of leaving cell 21 which of the three paths it will go.

In conventional network configurations and network configurations being currently under development, such as for 5G NR according to 3GPP, when network slicing is employed, the UE provides slice information in terms of NSSAI upon requesting a service. The UE has no explicit awareness when being in an RRC idle mode about the network support of a given slice. However, some limited slice-based access control is used. According to that, operator-defined access categories can be used to enable differentiated network access handling for different slices. For example, an NG-RAN may broadcast barring control information (i.e. a list of barring parameters associated with operator-defined access categories) to minimize the impact of congested slices. Furthermore, an exchange of information for slice support of neighbor cells (e.g. supported NSSAIs) as well as requested NSSAI in a HO request is done over interfaces between communication network control elements or functions, such as Xn/X2 between gNBs and/or eNBs. Moreover, as per 3GPP Release 15, for example, a target cell should reject a handover request when the corresponding NSSAI is not supported. Then, the UE would move to RRC idle mode as a consequence of the reject, in which state it requires some effort to identify a suitable cell with slice support because of the lack of the explicit awareness at the UE of which NSSAIs a cell support.

That is, according to current specification for a scenario of non-homogenous support of communication capabilities such as specific slices, first, the UE would go to RRC idle mode when entering cell 23 which does not support slice A, resulting in service interruption. It would be preferred to minimize such service interruptions, especially for the sA-UEs moving into cell 23 for short intervals. Secondly, a UE being in RRC idle mode probably requires, due to the UE unawareness of network support, more time to regain access in a slice-supporting cell which is also not optimal.

Basically, it is conceivable, for example, to consider the following measures when radio conditions dictate a handover to a cell which does not support a required slice.

As a first option, as described above, the call can be released and the UE trying to switch to the new cell (e.g. cell 23) is set into the idle mode. This would be useful, for example, for the UE 3 13, but not optimal for UE 1 10 and UE 2 12. Furthermore, when moving to the RRC idle mode, the re-selection to a cell supporting slice A may be slower or impaired due to lack of awareness at the UE of which cells support which slice.

Therefore, according to examples of embodiments, one target is to keep the UE in RRC connected mode to allow a network based mechanism for a smooth and network-controlled return to a slice supporting cell.

A second option is to execute a handover and continue with another slice provided by the cell 23 (e.g. the MNO slice which is supported by cell 23). This is useful for UE 2 12, but not optimal for UE 1 10 and UE 3 13. Furthermore, the configuration of the slice A service might get lost, since cell 23 does not support slice A and has no use for the configuration settings or is not able to understand it. Moreover, for cell 23, the UE appears to be satisfied with the provided slice, so that cell 23 (and hence the whole network) is not aware that the UE actually should use slice A when it enters another cell supporting again the slice A (e.g. cell 25). The mapping to another slice (e.g. the MNO slice) supported in the cell would already be done or proposed by cell 21 during the handover preparation.

A third option is to desperately keep the UE in cell 21 until a handover to cell 25 is possible. This would be useful for the UE 1 10, but not optimal for UE 2 12 and UE 3 13. Furthermore, this option has a high risk of failure, i.e. an RLF may occur due to a too-late handover.

When a RLF or HO failure occurs, the impacted UE can try to conduct an RRC connection re-establishment procedure and to restore communication services after such a failure. The UE can also send the source cell information in those re-establishment requests in order for the target cell (which is e.g. cell 23) to retrieve the UE context information for fast service resumption. For this, on the air interface (RRC) and Xn (between target and source cell), information and signaling are exchanged, such as a RRCConnectionReestablishmentRequest message for requesting the reestablishment of an RRC connection, and a RetrieveUEContext response message including, amongst others, an IE containing a list of PDU session resources to be setup which contains the required information to establish the PDU sessions along with the NSSAI that those PDU sessions belong to.

According to examples of embodiments, measures are provided which allow to ensure a service continuity in a non-homogenous network scenario, at least for a certain time, and to help guiding the UE to find a suitable cell with suitable communication capability or function support.

In the following, different exemplifying embodiments will be described using, as an example of a communication network to which examples of embodiments may be applied, a communication network architecture based on 3GPP standards for a communication network, such as a 5G or LTE network, without restricting the embodiments to such architectures, however. It is obvious for a person skilled in the art that the embodiments may also be applied to other kinds of communication networks having suitable means by adjusting parameters and procedures appropriately, e.g. Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the invention can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an gNB, a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

Figure 2:
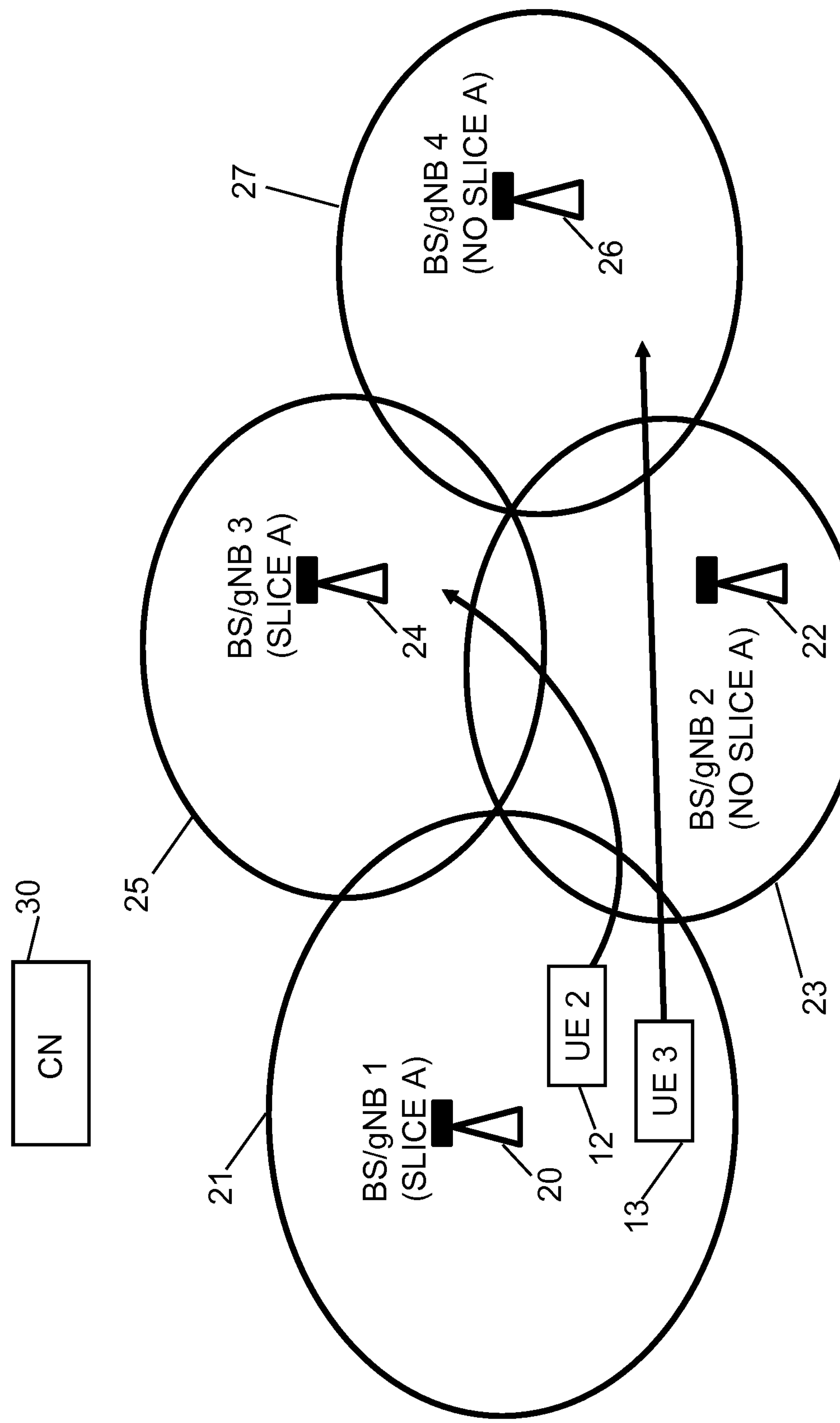
FIG. 2 shows a diagram illustrating a further example of a non-homogenous network scenario for explaining examples of embodiments.

FIG. 2 shows a diagram illustrating an example of a non-homogenous network scenario for explaining examples of embodiments. Specifically, FIG. 2 shows a simplified network part similar to that of FIG. 1, wherein a further cell 27 as an additional network area is provided which is controlled by a BS or gNB 4 26. In the example of FIG. 2, it is assumed that cell 27 does not support the specific communication capability of function (in the following, slide A is used as an example for this capability), i.e. it is similar to cell 23. Furthermore, for the sake of simplicity, only two sA-UEs are indicated, i.e. UE 12 and UE 13, wherein UE 12 is assumed to return to a cell supporting the slice A (i.e. cell 25), while UE 13 is assumed to remain in the network area not providing support for slice A (i.e. in cells 23 and 27).

According to examples of embodiments, the UEs (e.g. UE 12 and UE 13) are kept in the RRC connected mode to allow network control which can leverage network awareness of the slice support of neighbor cells.

Specifically, according to examples of embodiments, a source cell initially provisioning the given communication capability or function (e.g. slice A) to the UEs (i.e. cell 21) provides communication capability search mode information to a target cell which does not support the given communication capability (here slice A). The communication capability search mode information informs the target cell that the UE can be configured to be in a specific mode referred to hereinafter as a communication capability search mode which allows to quickly and smoothly resume the original communication capability (i.e. slice A) service as soon as possible when the UE enters again a cell (e.g. cell 25) which supports slice A.

In the following, two use cases are considered for connection switching scenarios. One use case concerns a (successful) handover from a source cell (e.g. cell 21) to a target cell (i.e. cell 23) when the UE (e.g. UE 2 12 or UE 3 13) enters the corresponding communication area and a connection switch (handover) is initiated (e.g. required due to UE measurements of connection quality or the like). Another use case is a connection re-establishment after a failure (e.g. RLF in cell 21, or handover failure from cell 21 to cell 23), wherein a successful re-establishment of the communication connection to cell 23 is assumed.

First, a processing in case of a (successful) handover from cell 21 to cell 23 is discussed.

When referring to FIG. 2, it is assumed that the currently connected cell 21 initiates a regular handover to cell 23. According to examples of embodiments, cell 21 is aware that cell 23 is not supporting slice A, so that cell 21 takes measures to put the sA-UE (UE 2 12, for example) to a communication capability search mode. For this purpose, the cell 21 (i.e. the gNB 20) provides communication capability search mode information to the cell 23 (i.e. the gNB 22), e.g. in a handover request message signaling between the gNBs 20 and 22.

During the communication capability search mode period, the network part to which the UE is then connected (e.g. cell 23) prioritizes handovers to cells which support slice A (e.g. cell 25 or even cell 21 in case the UE moves back to the coverage area thereof).

Furthermore, according to examples of embodiments, a timer can be set defining a configurable time T_SliceSearch wherein after elapsing of the time T_SliceSearch the connection to the UE is released when no handover to a slice A supporting cell is executed. According to further examples of embodiments, before releasing the connection, the network (e.g. the then connected cell 23) sends information regarding dedicated priorities optimized to prioritize frequency layers supporting slice A which are to be used by the UE (which is in RRC idle mode or a comparable mode, such as RRC inactive mode as defined by 5G NR specifications, after the connection release) for cell reselection purposes.

Moreover, according to some examples of embodiment, the communication capability search mode includes that the UE is configured to temporarily accept and use a downgraded service (related to the service of slice A) which can be supported by a slice supported in cell 23, such as the MNO slice in cell 23. This is executed in case a service continuity is necessary.

Furthermore, according to some examples of embodiment, in the communication capability search mode, the target cell which does not support slice A (e.g. cell 23) store QoS information related to the slice A service in the UE context, even in case the information is not usable for the cell 23. The reason is that the stored information is used later in case a handover to a slice A supporting cell (e.g. cell 25) is possible. In other words, despite the fact that the target cell 23 uses different QoS information for the UE, the QoS information related to the slice A service are maintained.

That is, when the communication capability search mode is initiated by the source cell (i.e. cell 21) by sending the assisting communication capability search mode information to cell 23, e.g. added to a handover request via the Xn/X2 interface, it includes at least an indication which informs the target cell 23 to use the communication capability search mode. Furthermore, additional relevant information can be added, which includes, for example, one or more of the following:

- Information indicating the communication capability or function (i.e. MEC, slice A etc.), such as corresponding NSSAI(s) or other information for the corresponding communication capability which should be searched for a prioritized handover, i.e. for which the communication capability search mode is to be applied. It is to be noted that the NSSAIs etc. can be already part of PDU session details in a handover request. That is, this information part is only needed when e.g. the set of communication capability that is to be searched deviates from indications in the already available list of a HO request.
- Information about the neighbor cells supporting the given communication capability (e.g. slices) (such as an indication of cell 25), and a proposal for a suitable measurement configuration. On the basis of measurement reports provided by the UE (e.g. UE 2 12), the communication capability search mode information can be adapted by the source cell (here cell 21) in such a manner that measurement configuration only for relevant (e.g. strongest) neighboring cells are included. Alternatively, measurement configurations of all neighboring cells supporting the slice A can be provided.
- Information about the duration of the timer indicating T_SliceSearch for searching a new cell that supports the communication capability (e.g. slice A). The duration can be set, for example, on the basis of the service type carried by the slice A, or on the basis of a knowledge of the QoS parameters that may be provided by slice MNO of cell 23. Furthermore, the duration can consider knowledge of the SLA of the slice and related QoS targets violation costs. The timer for T_SliceSearch is started, for example, by the target cell (i.e. cell 23) when the connection switch (e.g. handover) of the UE is completed. The timer is stopped when the UE (e.g. UE 2 12) is handed over by the target cell 23 to another cell (i.e. cell 25) that supports slice A. Upon the expiry of timer, the connection of the UE (e.g. for UE 3 13) can be released, unless other services provided by the then connected cell (cell 23) still require the connection.
- Information about how to prioritize communication capability supporting cells. For example, it is possible to indicate values like thresholds (e.g. strong/moderate/weak) for setting a priority order when plural candidates of cells supporting slice A (i.e. to which the UE (e.g. UE 2 12) can be switched in the communication capability search mode) are available. This can also take into account, for example, overall slice demands of the UE vs. the slice support at various neighbour cells. It is to be noted that in case multiple slices or communication capabilities shall be searched (i.e. not only slice A but also other slices or communication capabilities are demanded), a separate prioritization level per slice can be provided.
- Information whether the UE requires service continuity. In this case, as indicated above, mapping of the UE to a (e.g. partially) downgraded service is to be conducted. In this case, also information regarding a required QoS for such a downgraded service can be provided.
- Information regarding QoS of the communication capability (e.g. slice A) service. This information can be used by the target cell, for example, for determining own resources to be reserved for providing a downgraded service When the target cell 23 (i.e. gNB 22) has received and accepted the handover request from the source cell 21, it configures the UE (UE 2 12, UE 3 13) as usual, making use of the information received from the source cell 21. In addition, the obtained knowledge regarding the communication capability support of neighboring cells is used. That is, due to the communication capability search mode, the target cell configures the UEs such that earlier handover measurements for neighboring cells supporting the communication capability (e.g. slice A) (i.e. cells 21 and 25) are set, e.g. by defining a smaller handover offset or TTT.

Additionally, according to examples of embodiments, the UE configuration comprises also later measurements for neighboring cells not supporting the communication capability (e.g. slice A) (such as cell 27), e.g. by defining larger handover offset or TTT.

In case a service continuity is indicated, the target cell 23 can map the UE (at least temporarily) to the MNO slice (or another slice) supported in cell 23, so as to provide a (partially downgraded) service for the UE. Furthermore, the target cell 23 stores information indicating the QoS of the original communication capability (e.g. slice A), for example in the UE context. This is done also in case the cell 23 actually uses different QoS information (e.g. for the provision of the downgraded service) for the UE.

According to examples of embodiments, the UE (UE 2 12 and UE 3 13), when being handed over to the new cell (target cell 23), is not aware of the communication capability search mode. In this case, the control of the network is transparent for the UE, i.e. there is no action on the UE side besides default measures.

Alternatively, according to further examples of embodiments, the UE can be informed about the communication capability search mode. That is, the network sends an information to the UE so as to indicate that it is in communication capability search mode. In this case, the UE can be prevented from continuously requesting e.g. slice A service when it is connected to cell 23 not supporting slice A. This information can be sent either by the source cell or by the target cell.

When referring to the UE 2 12, it can be seen that it approaches cell 25 supporting slice A. In this case, the currently connected cell 23 executes a prioritized handover (e.g. by means of the early measurement report from the UE which is based on the setting made in the UE configuration described above) to this cell 25. By providing the slice A QoS information stored in the UE context, the cell 23 (being now the source cell for the handover) enables the target cell 25 to resume the slice A service as soon as the handover is completed. In case a timer for T_SliceSearch is provided, this is stopped in case the UE 2 12 is handed over to cell 25.

On the other hand, when referring to UE 3 13, it can be seen that it approaches cell 27 which does not support slice A. In this case, the currently connected cell 23 executes also a handover to cell 27. In this case, the communication capability search mode information (including also slice A QoS information stored in the UE context) is forwarded to the cell 27 (i.e. the gNB 26). This includes also a value of the timer for T_SliceSearch (reduced by the dwell time in cell 23). That is, cell 27 takes over from cell 23 and conducts a corresponding procedure, including prioritized handover, information forwarding or connection release.

That is, for example, in case the timer for T_SliceSearch expires, the (now serving) cell 27 (or cell 23 in case no handover at all took place so far) terminates the call and sends the UE (e.g. UE 3 13) to the RRC idle state. This guarantees that the UE 3 13 does not unnecessarily block radio resources for an undefined time period.

It is to be noted that the cells being involved in the communication capability search mode can be of different radio access technologies. For example, cell 23 and 27 (i.e. the cells not supporting slice A) are of a different radio access technology RAT, such as Long Term Evolution (LTE) or WLAN, while cell 21 and 25 (i.e. the cells supporting the slice A) are e.g. NR or 5G cells. In this case, parts of the communication capability search mode information are not understood in the other RAT (for example, the NSSAIs is not known to this RAT). Hence, according to examples of embodiments, the information is packed into a transparent container, to be used later on when the UE is back in the NR domain. Other information, such as the prioritization information or T_SliceSearch, can also be used in the other RAT in the same way as described above.

As indicated above, examples of embodiments being described above are related to a scenario where a successful handover between cell 21 and cell 23 takes place. However, corresponding principles are also applicable in case of a successful re-establishment after an RLF or HO failure.

For example, assuming a case where cell 21 applies too aggressive handover parameters, e.g. in order to keep the UE (UE 2 12 or UE 3 13, for example) in cell 21. For example, a configuration can be set defining a late handover to cell 23 and an early handover to cell 25. Then, an RLF or a handover failure occurs, i.e. the UE loses connection to cell 21. Since the UE uses the slice A service (but is not aware of the support situation of the cells), it tries a connection re-establishment to a cell which supports slice A. In case it is in a cell supporting slice A, there is no problem. However, when the UE tries connection re-establishment to a cell which does not support slice A (e.g. cell 23), the following applies.

Assuming cell 23 has already the UE context including the information regarding the communication capability search mode. This is the case, for example, when the network (i.e. cell 21) has already initiated the handover (i.e. cell 21 is source cell and cell 23 is target cell), and the failure has occurred after the preparation. In this case, measures corresponding to those described above can be executed.

On the other hand, when assuming a case where the contacted cell (i.e. cell 23) does not have the UE context information. In this case, cell 23 sends an RLF indication to the former cell 21 with an indication that it would like to fetch the context from cell 21. Cell 21 replies with a handover request message (such as that described above) for handover preparation. So again, measures corresponding to those described above can be executed.

It is to be noted that in case a context fetching fails (e.g. if either cell 23 or cell 21 does not support context fetching), then re-establishment is not successful and the UE will go to RRC idle mode.

As an illustrative use case for the above described concept, autonomous driving can be considered as an example for a slice A service. This service may not be supported in any given geographical area, e.g. not on all streets. When a UE using autonomous driving, e.g. installed in an autonomous vehicle, enters a cell (such as cell 23) without this support, it may still use other V2X services. Nevertheless, it is preferred that the UE returns to an autonomous driving cell as soon as possible so as to resume the autonomous driving with the same service parameters.

According to examples of embodiments, for implementing a processing as described above, various signaling and messages can be employed in a communication environment. For example, in a signaling between the communication network control elements or functions involved, such as the gNBs 20, 22, 24, 26 as shown in FIG. 2, which is forwarded e.g. by means of Xn/X2 information elements, and in a signaling between the UE and the respective communication network control elements or functions involved, which is forwarded e.g. via Uu information elements, one or more of the following is included.

As part of a signaling used for a handover request, such as in a Handover Request message, the respective source cell adds an indication such as a "Use communication capability search mode" flag that instructs the target cell to use the communication capability search mode. For example, the communication capability search mode is to be set for the NSSAI(s) included in the PDU session, unless a deviating list is signaled which then replaces them. That is, as another part of a signaling used for a handover request, such as in a Handover Request message, the respective source cell can add a list of NSSAI(s) for which the communication capability search mode shall be applied (this is only needed when the list deviates from the NSSAIs provided in the PDU session information).

Moreover, as a part of a signaling used for a handover request, such as in a Handover Request message, the respective source cell adds information indicating a Handover Prioritized List which includes required information to prioritize handover to certain cells with communication capability support. As mentioned above, a separate prioritization level can be provided for each entry of the list (i.e. each communication capability to be searched), On the other hand, the target cell can indicate to the UE in a signaling towards it that it is configured in the communication capability search mode. For example, this is achieved by using a transparent container forwarded to the source cell in a handover request acknowledge signaling, which is then transmitted over the radio link as part of the handover command (RRC connection reconfiguration). Alternatively, the indication for communication capability search mode can be provided to the UE by the target cell, e.g. by using an RRC signaling after completing the handover. As another alternative for providing the information that it is in the communication capability search mode, the UE is informed by the source cell which indicates to the UE by using the handover command that it is configured in communication capability search mode.

As described above, according to some examples of embodiments, a value of the timer for T_SliceSearch (i.e. the period of time after which the connection of the UE is released when no slice A supporting cell is found) depends e.g. on the service type provided by the communication capability. For example, in case of services such as URLLC services, which may only tolerate a short discontinuity, or a short down-degradation, a timer value of e.g. a second or less is set. Still, this would give the UE the chance for very quick resumption when leaving the slice area for a short moment. Other service may tolerate longer interruptions of e.g. several minutes or even longer.

The communication capability search mode still allows an earlier resumption of the service in cases when the UE rests in front of a communication capability supporting cell, where normal reselection/handover parameters would not make the UE to connect to this cell. According to examples of embodiments, the prioritization during communication capability search mode allows to push the UE to such a communication capability supporting cell.

By means of the above described measures using the communication capability search mode, it is possible to provide a network based mechanism allowing guiding the UE to find a suitable cell with a corresponding communication capability support, wherein data exchange between communication network control elements or functions (e.g. on X2/Xn interface) can be used. In particular, the transition of the UE into RRC idle state where only legacy mechanisms can be used to prioritize cells with communication capability support without explicit awareness of communication capability support is at least delayed. Moreover, by configuring the UE in communication capability search mode, the UE will refrain from trying continuously to request in a cell an unavailable slice/service.

Furthermore, by implementing the timer for T_SliceSearch, it is possible to improve the situation for a UE which does not return to a communication capability supporting cell (such as UE 3 13), since the call will be terminated (with some delay), while there is still given a chance to recover.

On the other hand, resumption of the former used service when entering a communication capability supporting cell (e.g. cell 21 or 25) can be performed quicker and with less signaling compared to a case without communication capability search mode, in case the UE is kept in the connected mode. For example, no connection setup required, i.e. no contention based RACH, no authentication, etc.

It is to be noted that the communication capability search mode concept as discussed above is compatible, for example, with approaches using fine-adjusting of handover parameters, which is applicable for example in case of a sA-UE behaving like UE 1 10. That is, it is still possible to try to keep an UE as long as possible in a communication capability supporting cell and/or prefer handovers to communication capability supporting cells, but the parameters for the handover can be set such that a desperate mode is not necessary anymore. In other words, the failure risk can be reduced since the communication capability search mode allows to keep the service discontinuity short.

Furthermore, although a cell like cell 23 which does not support the communication capability or function (e.g. slice A) and may thus not understand the configuration information of e.g. slice A, it is possible to store in the communication capability search mode the slice A configuration information, for example in a container or the like, for later usage in case a handover to a cell supporting slice A is possible (e.g. to cell 25). Then, the information can be forwarded during the next handover(s) so that the cell not supporting the slice A acts as a relay for the configuration for later usage in slice A supporting cells.

Figure 3:
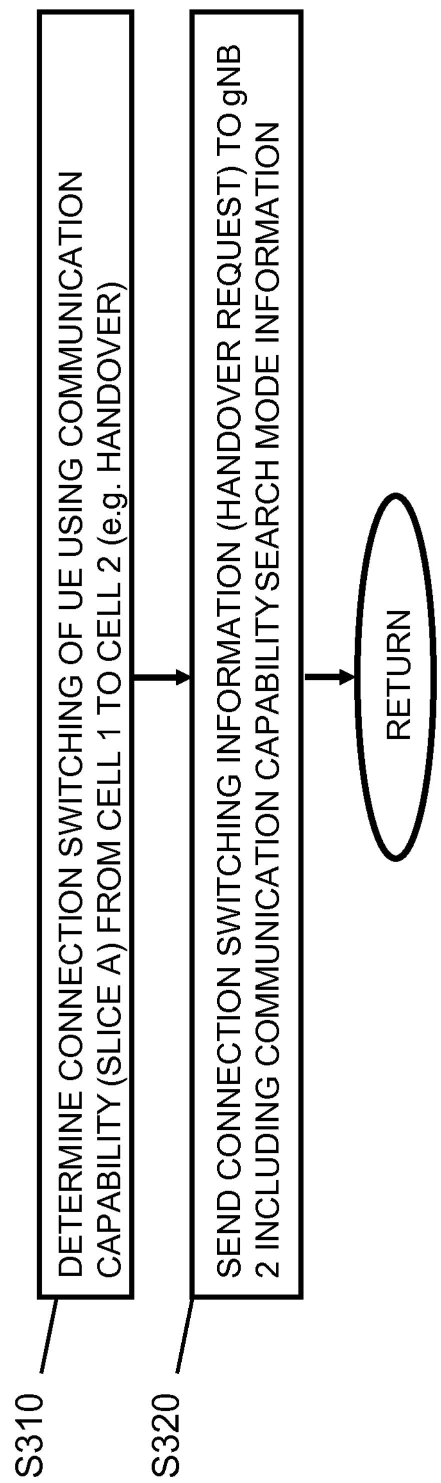
FIG. 3 shows a flow chart of a processing executed by a communication network control element or function of a source cell according to some examples of embodiments.

FIG. 3 shows a flow chart of a processing executed by a communication network control element or function of a source cell (such as gNB 20) which controls a communication connection of at least one communication element or function in a network area or cell providing a specific communication capability or function (e.g. MEC, security scheme support, slice support e.g. for slice A, etc.) according to some examples of embodiments.

In S310, it is determined that a communication element or function communicating in the first network area and using the specific communication capability or function (i.e. a sA-UE) enters a second network area (e.g. cell 23) which does not provide the specific communication capability or function, wherein a switching of the connection (e.g. handover) of the sA-UE to the second network area is to be conducted.

In S320, connection switching information related to the switching of the communication connection of the communication element or function is sent to a second communication network control element or function (e.g. gNB 22) configured to control a communication connection of the communication element or function in the second network area. The information comprises a communication capability search mode indication for informing the second communication network control element or function to set the communication element or function into a communication capability search mode in which a connected mode of the communication element or function is maintained and a further switching of the communication connection to another network area providing the specific communication capability or slice is accelerated.

According to some examples of embodiments, the connection switching information comprising the communication capability search mode indication is sent when a handover of the communication element or function from the first network area to the second network area is to be conducted. Alternatively, the connection switching information comprising the communication capability search mode indication is sent when a radio link failure indication for the communication element or function is received from the second communication network control element or function.

According to some examples of embodiments, the connection switching information comprising the communication capability search mode indication comprises an indication of the specific communication capability or function used by the communication element or function which is to be searched (e.g. the NSSAIs) for the further switching of the communication connection to another network area. Alternatively or additionally, according to some examples of embodiments, the communication capability search mode indication comprises information identifying candidate neighboring network areas providing the specific communication capability or function (e.g. ID of cell 25). Alternatively or additionally, according to some examples of embodiments, the communication capability search mode indication comprises information indicating measurement settings for searching network areas providing the specific communication capability or function. Alternatively or additionally, according to some examples of embodiments, the slice search mode indication comprises timer information (e.g. T_SliceSearch) indicating a timing for which the communication element or function is to be kept in the communication capability search mode and when a communication connection to the communication element or function can be released. Alternatively or additionally, according to some examples of embodiments, the communication capability search mode indication comprises information indicating a prioritizing of network areas providing the specific communication capability or function. Alternatively or additionally, according to some examples of embodiments, the communication capability search mode indication comprises an indication whether the communication element or function requires service continuity after switching the communication connection to the second network area. Alternatively or additionally, according to some examples of embodiments, the communication capability search mode indication comprises an indication of a quality of service level provided in a communication connection of the communication element or function in the second network area. Alternatively or additionally, according to some examples of embodiments, the communication capability search mode indication comprises an indication of a quality of service level provided in a communication connection of the communication element or function when using the specific communication capability or function.

Figure 4:
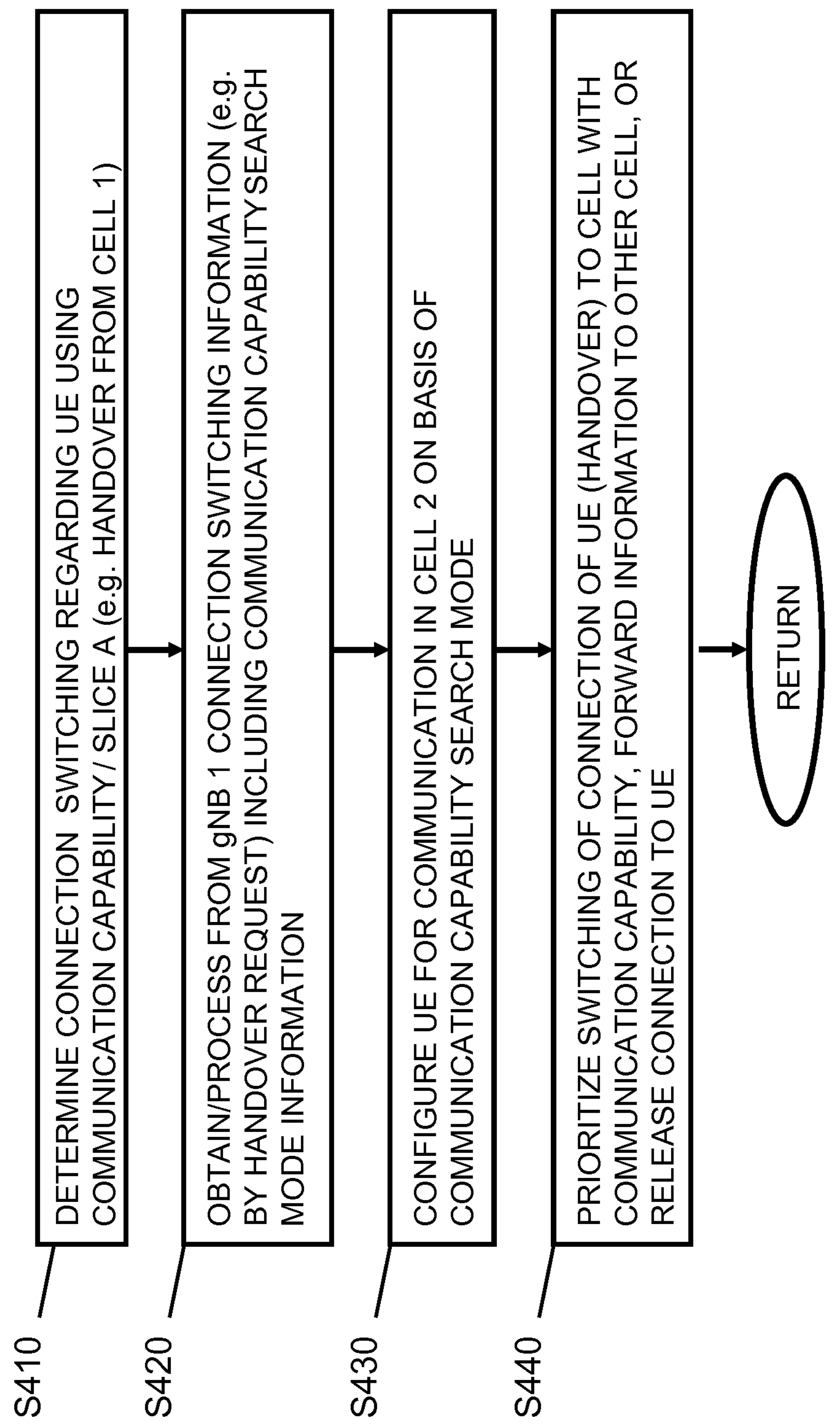
FIG. 4 shows a flow chart of a processing executed by a communication network control element or function of a target cell according to some examples of embodiments.

FIG. 4 shows a flow chart of a processing executed by a communication network control element or function of a target cell (such as gNB 22) which controls a communication connection of at least one communication element or function in a network area or cell which does not provide the specific communication capability or function (e.g. no slice A) according to some examples of embodiments.

In S410, a connection switching (e.g. a handover or a re-establishment of a communication connection) to the second network area by a communication element or function using the specific communication capability or function in the first network area is determined (for example, a handover request from gNB 20 is received or a connection reestablishment request from a sA-UE after RLF is received).

In S420, connection switching information related to the switching of the communication connection of the communication element or function is received from a first communication network control element or function (e.g. gNB 20) configured to control a communication connection of the communication element or function in the first network area and processed. The information comprises a communication capability search mode indication for informing to set the communication element or function into a communication capability search mode in which a connected mode of the communication element or function is maintained and a further switching of the communication connection to another network area providing the specific communication capability or function is accelerated.

For example, the connection switching information comprising the communication capability search mode indication is obtained in a handover request message from the first communication network control element or function when a handover of the communication element or function from the first network area to the second network area is to be conducted. Alternatively, the connection switching information comprising the communication capability search mode indication is obtained in response to a radio link failure indication for the communication element or function trying to re-establish a communication connection via the second network area.

According to some examples of embodiments, the connection switching information comprising the communication capability search mode indication comprises an indication of the specific communication capability or function used by the communication element or function which is to be searched (e.g. the NSSAIs) for the further switching of the communication connection to another network area. Alternatively or additionally, according to some examples of embodiments, the communication capability search mode indication comprises information identifying candidate neighboring network areas providing the specific communication capability or function (e.g. ID of cell 25). Alternatively or additionally, according to some examples of embodiments, the communication capability search mode indication comprises information indicating measurement settings for searching network areas providing the specific communication capability or function. Alternatively or additionally, according to some examples of embodiments, the communication capability search mode indication comprises timer information (e.g. T_SliceSearch) indicating a timing for which the communication element or function is to be kept in the communication capability search mode and when a communication connection to the communication element or function can be released. Alternatively or additionally, according to some examples of embodiments, the communication capability search mode indication comprises information indicating a prioritizing of network areas providing the specific communication capability or function. Alternatively or additionally, according to some examples of embodiments, the communication capability search mode indication comprises an indication whether the communication element or function requires service continuity after switching the communication connection to the second network area. Alternatively or additionally, according to some examples of embodiments, the communication capability search mode indication comprises an indication of a quality of service level provided in a communication connection of the communication element or function in the second network area. Alternatively or additionally, according to some examples of embodiments, the communication capability search mode indication comprises an indication of a quality of service level provided in a communication connection of the communication element or function when using the specific communication capability or function.

In S430, the communication element or function is configured for a communication connection in the second network area on the basis of the connection switching information comprising the communication capability search mode indication.

According to some examples of embodiments, the communication element or function is informed about the communication capability search mode and instructed to cancel requesting in the second network area for a service based on the specific communication capability or function.

In case service continuity of the communication element or function is required, the communication element or function is mapped to a communication capability or function provided by the second network area (e.g. slice MNO). Thus, a (partially) downgraded service is provided to the communication element or function.

In S440, a connection control is conducted including e.g. a prioritized switching (i.e. handover) of the connection of the communication element or function to a cell supporting the communication capability or function (e.g. to cell 25), forwarding of relevant information (i.e. communication capability search mode indication, timer information) to other cells when the connection is switched to another network area not supporting the communication capability or function (e.g. cell 27), or to release the connection to the communication element or function.

For example, according to some examples of embodiments, it is determined whether the timer (T_SliceSearch) is elapsed. Furthermore, it is determined whether other services are required for the communication element or function. In case the timer is elapsed and no other services are required, the communication connection to the communication element or function is released so as to set the communication element or function into an idle or inactive state.

Furthermore, according to some examples of embodiments, when the communication connection to the communication element or function is released, support information is forwarded to the communication element or function. The support information is usable by the communication element or function in the idle or inactive state and indicates prioritized frequency layers of other network areas providing the specific communication capability or function.

Moreover, according to some examples of embodiments, the timer (T_SliceSearch) is stopped when a further switching (handover) of the communication connection of the communication element or function to another network area providing the specific communication capability or function (e.g. cell 25) is conducted. Alternatively, when a further switching (handover) of the communication connection of the communication element or function to another network area not providing the specific communication capability or function is conducted (e.g. cell 27), information indicating the timer value minus a dwelling time of the communication element or function in the second network area and information comprising at least a part of the connection switching information comprising the communication capability search mode indication (e.g. the QoS configuration information for the slice A) are forwarded to a corresponding communication network control element or function (e.g. gNB 26)

In addition, according to some examples of embodiments, the indication of the quality of service level provided in a communication connection of the communication element or function when using the specific communication capability or function is stored. The indication is provided to a communication network control element or function of another network area (e.g. the gNB of cell 25 or cell 27) when switching the communication connection of the communication element to the other network area.

Moreover, according to some examples of embodiments, a prioritized switching of the communication connection of the communication element or function to a network area providing the specific communication capability or function is initiated under consideration of the information indicating the prioritizing of network areas providing the specific communication capability or function (e.g. a priority order of cells).

Furthermore, according to some examples of embodiments, a prioritized switching of the communication connection of the communication element or function to a network area providing the specific communication capability or function is initiated by configuring earlier handover measurements for neighboring network areas providing the specific communication capability or function and by configuring later handover measurement neighboring network areas not providing the specific communication capability or function.

Figure 5:
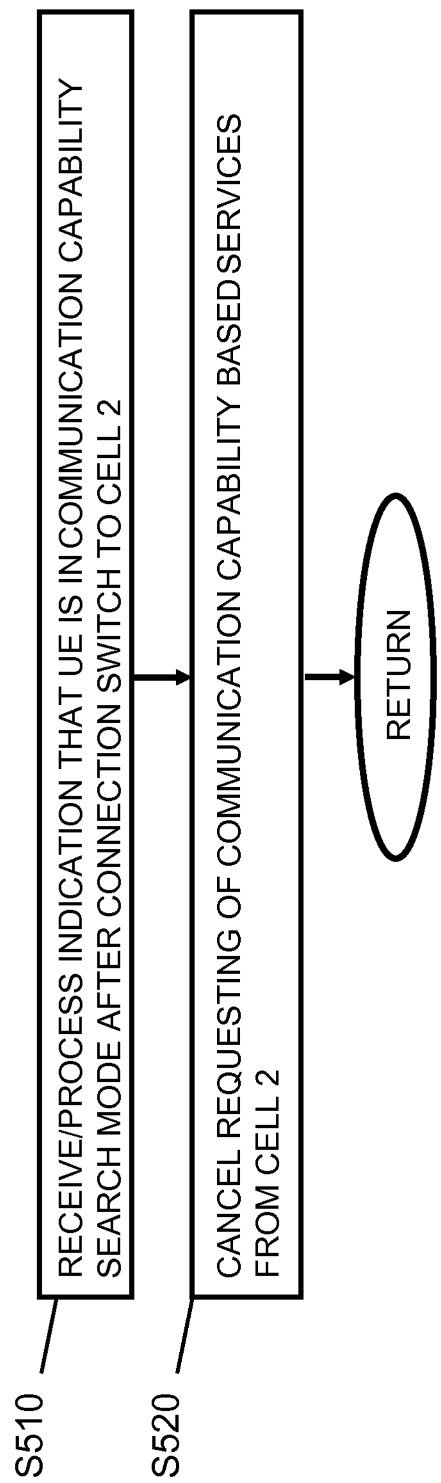
FIG. 5 shows a flow chart of a processing executed by a communication element or function like a UE according to some examples of embodiments.

FIG. 5 shows a flow chart of a processing executed by a communication element or function (i.e. a sA-UE like one of UEs 10, 12, 13) configured to establish a communication connection in a network area providing a specific communication capability or function according to some examples of embodiments.

In S510, when a switching of communication connection from the first network area (e.g. cell 21) to a second network area (e.g. cell 23) which does not provide a specific communication capability or function is conducted, an indication that the communication element or function is set in a communication capability search mode is received and processed. In this communication capability search mode, a connected mode of the communication element or function is maintained and a further switching of the communication connection to another network area providing the specific communication capability or function is accelerated.

According to some examples of embodiments, the indication that the communication element or function is set in a communication capability search mode is received from a communication network control element or function of the first network area (i.e. the source cell) or from a communication network control element or function of the second network area (i.e. the target cell).

In S520, requesting in the second network area for a service based on the specific communication capability or function is cancelled or stopped.

Furthermore, according to some examples of embodiments, when the communication connection to the second network area is released (e.g. due to expiry of timer T_SliceSearch), support information is received and processed, which is usable by the communication element or function in an idle or inactive state and indicates prioritized frequency layers of other network areas providing the specific communication capability of function. Then, a network area reselection processing is executed by using the support information.

Figure 6:
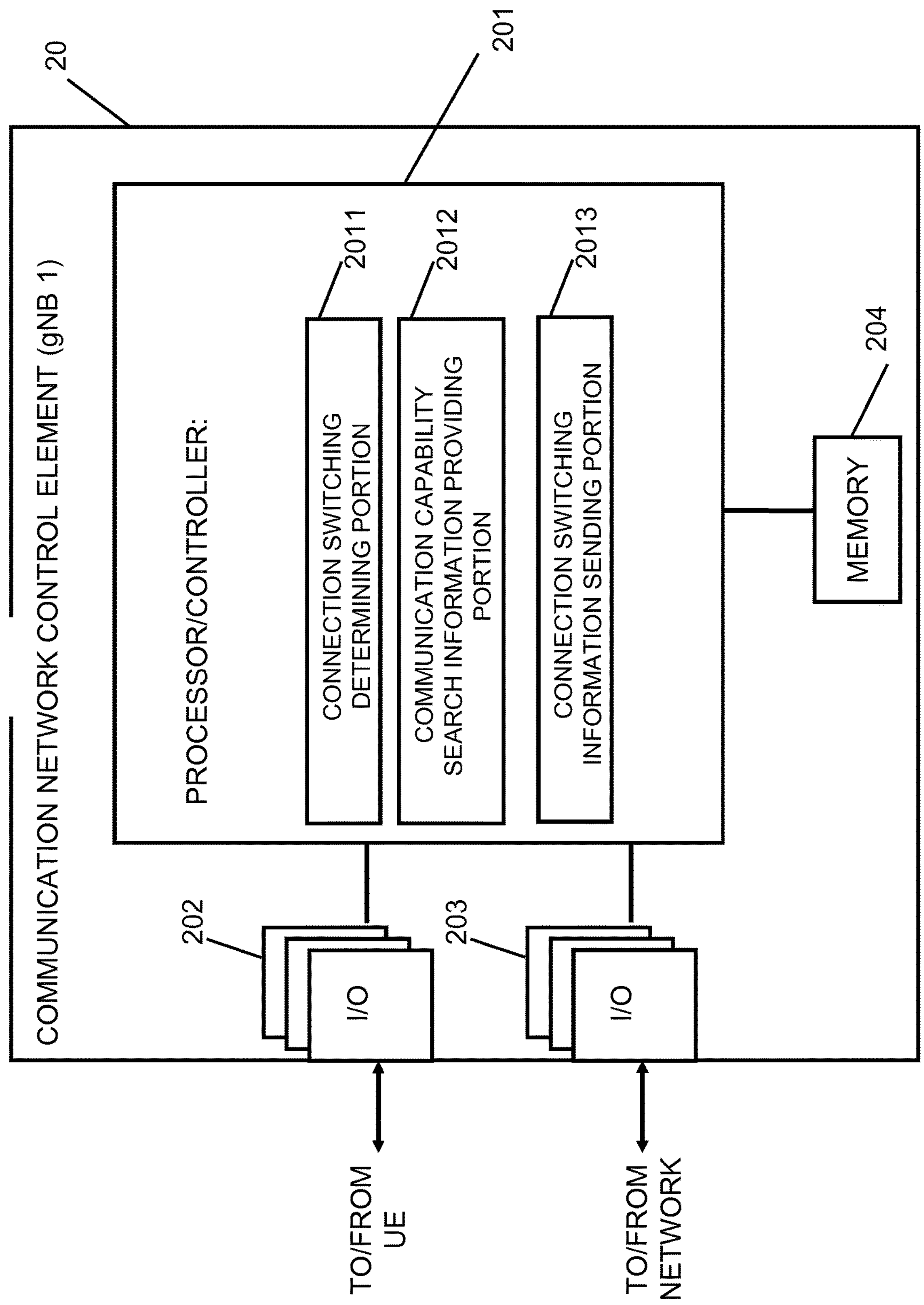
FIG. 6 shows a diagram of a network element or function acting as a communication network control element or function of a source cell according to some examples of embodiments.

FIG. 6 shows a diagram of a network element or function acting as a communication network control element or function controlling a source cell according to some examples of embodiments, i.e. the gNB 20 of FIG. 2, which is configured to conduct a communication connection control procedure as described in connection with some of the examples of embodiments. It is to be noted that the communication network control element or function, like the gNB 20 of FIG. 2, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element like the gNB 20 shown in FIG. 6 may include a processing circuitry, a processing function, a control unit or a processor 201, such as a CPU or the like, which is suitable for executing instructions given by programs or the like related to the communication connection control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with the communication element or function like the UEs 10, 12, 13, as described in connection with FIG. 2, for example. The I/O units 203 may be used for communicating with the network, like the CN 30 or other gNBs, as described in connection with FIG. 2, for example. The I/O units 202 and 203 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described communication connection control processing. In particular, the processor or processing circuitry or function 201 includes one or more of the following sub-portions. Sub-portion 2011 is a processing portion which is usable as a portion for determining a connection switching (e.g. handover) of the UE. The portion 2011 may be configured to perform processing according to S310 of FIG. 3. Furthermore, the processor or processing circuitry or function 201 may include a sub-portion 2012 usable as a portion for providing communication capability search information. The portion 2012 may be configured to perform a processing according to S320 of FIG. 3. In addition, the processor or processing circuitry or function 201 may include a sub-portion 2013 usable as a portion for sending connection switching information. The portion 2013 may be configured to perform a processing according to S320 of FIG. 3.

Figure 7:
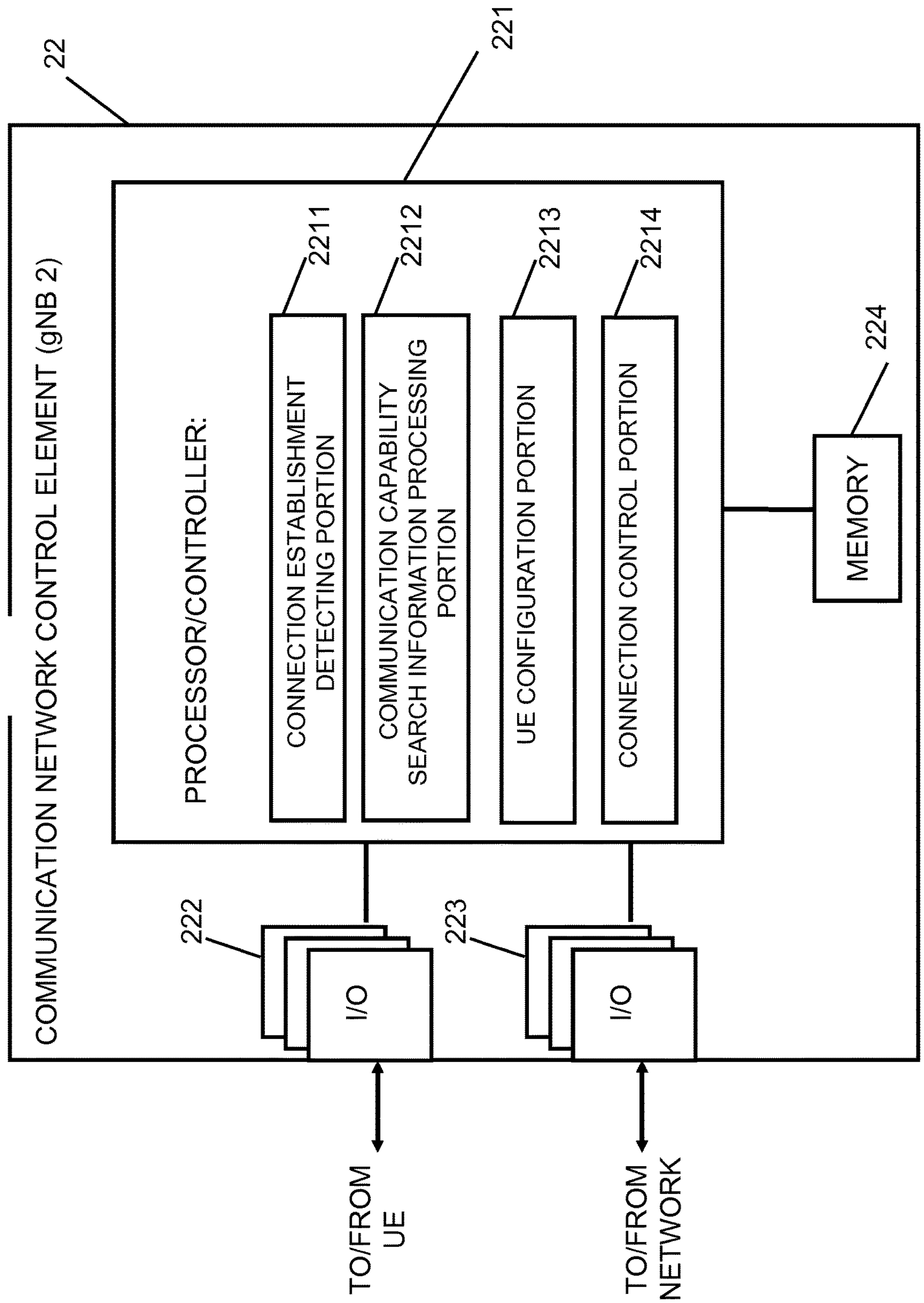
FIG. 7 shows a diagram of a network element or function acting as a communication network control element or function of a target cell according to some examples of embodiments.

FIG. 7 shows a diagram of a network element or function acting as a communication network control element or function controlling a target cell according to some examples of embodiments, i.e. the gNB 22 of FIG. 2, which is configured to conduct a communication connection control procedure as described in connection with some of the examples of embodiments. It is to be noted that the communication network control element or function, like the gNB 22 of FIG. 2, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element like the gNB 22 shown in FIG. 7 may include a processing circuitry, a processing function, a control unit or a processor 221, such as a CPU or the like, which is suitable for executing instructions given by programs or the like related to the communication connection control procedure. The processor 221 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 222 and 223 denote input/output (I/O) units or functions (interfaces) connected to the processor or processing function 221. The I/O units 222 may be used for communicating with the communication element or function like the UEs 10, 12, 13, as described in connection with FIG. 2, for example. The I/O units 223 may be used for communicating with the network, like the CN 30 or other gNBs, as described in connection with FIG. 2, for example. The I/O units 222 and 223 may be a combined unit including communication equipment towards several entities, or may include a distributed structure with a plurality of different interfaces for different entities. Reference sign 224 denotes a memory usable, for example, for storing data and programs to be executed by the processor or processing function 221 and/or as a working storage of the processor or processing function 221. It is to be noted that the memory 224 may be implemented by using one or more memory portions of the same or different type of memory.

The processor or processing function 221 is configured to execute processing related to the above described communication connection control processing. In particular, the processor or processing circuitry or function 221 includes one or more of the following sub-portions. Sub-portion 2211 is a processing portion which is usable as a portion for determining a connection switching of the UE. The portion 2211 may be configured to perform processing according to S410 of FIG. 4. Furthermore, the processor or processing circuitry or function 221 may include a sub-portion 2212 usable as a portion for processing communication capability search information. The portion 2212 may be configured to perform a processing according to S420 of FIG. 4. In addition, the processor or processing circuitry or function 221 may include a sub-portion 2213 usable as a portion for configuring the UE. The portion 2213 may be configured to perform a processing according to S430 of FIG. 4. Furthermore, the processor or processing circuitry or function 221 may include a sub-portion 2214 usable as a portion for controlling the UE connection. The portion 2214 may be configured to perform a processing according to S440 of FIG. 4.

While the above described examples of embodiments are related to the communication capability search mode for keeping the sA-UE in the connected state when being handed over to a network area which does not support the communication capability or function (e.g. slice A) used in the source cell, in the following, examples of embodiments are described which address the problem caused by a non-homogenous communication capability support in the communication network by leveraging dual or multi connectivity (DC/MC) communication. As indicated above, DC and MC are considered as a connection switching of the communication connection of the UE to the network since the connection type is changed.

DC as standardized, for example, by 3GPP in LTE Release 12/13, extends carrier aggregation (CA) functionality to allow a UE to simultaneously receive/send data from two different communication network control elements or functions, such as two eNBs. In 5G new radio (NR) standardization activities, DC is standardized enabling the support of E-UTRA-NR DC (EN-DC), i.e. DC between NR and LTE, and also NR-NR DC, i.e. DC between two NR sites.

Rel-15 DC is a solution for throughput boosting (using data split at PDCP layer) as well as data robustness and reliability boosting for services like URLLC (by means of PDCP level data duplication across the different nodes). In the following, without loss of generality, examples will be described in which NR-NR DC or MC is employed, wherein a sA-UE is connected to a NR next generation node (gNB) as a Master Node (MgNB) and one or more Secondary gNB Nodes (SgNB).

In conjunction with DC/MC, split Signaling Radio Bearer (SRB) is used for improving signaling robustness allowing the selection of either the direct path (i.e. given node to UE) or the path via the other node, as well as the duplication of RRC PDUs via both nodes.

DC (as well as MC) in NR inherits a design where a UE configured in DC can benefit from resources from a master cell (MCell) and a secondary cell (Scell) simultaneously. In particular, MCG split bearer, SCG split bearer, and SCG bearer are supported. For example, in DC solutions, such as in case of EN-DC, MCG split bearer configuration is a solution where a control plane (c-plane) link to the UE is established between the master node and the UE while a user plane (u-plane) link is established from the CN via the master node to the UE as well as between the secondary node and the UE (which is split from the master node to the secondary node); SCG bearer configuration is a solution where a c-plane link to the UE is established from the CN via the master node and the UE while a u-plane link is established from the CN via the secondary node to UE; SCG split bearer configuration is a solution where a c-plane link to the UE is established from the CN via the master node to the UE, while a u-plane link is established from the CN via the secondary note to the UE as well as between master node and the UE (which is split from the secondary node to the master node). It is to be noted that a UE can have two RRC connections to the network, namely the LTE RRC and NR RRC connections.

Conventionally, whenever the radio channel of any of the cells involved in DC is not good enough, a cell change (or handover) happens if possible, and eventually DC will be released. However, according to examples of embodiments, a UE is allowed to use DC or MC although no radio connections may be possible to one of the cells.

It is to be noted in DC as per 3GPP (but basically also in MC) a master cell group (MCG)/secondary cell group (SCG) is defined as a group of serving cells associated with the master node (MN)/secondary node (SN). In other words: all cells in a MCG belong to MN and all cells in SCG belong to SN. In MC, a UE may can have more than one SN.

For example, a primary cell is a MCG cell, operating on the primary frequency, in which the UE either performs the initial connection establishment procedure or initiates the connection re-establishment procedure. A primary SCG cell (PSCell) is, for a DC operation, the SCG cell in which the UE performs random access when performing the Reconfiguration with Sync procedure. On the other hand, the SCG is, for a UE configured with DC, the subset of serving cells comprising the PSCell and zero or more secondary cells.

Furthermore, it is to be noted that for LTE-WiFi aggregation (LWA), i.e. DC between LTE and WiFi, it is proposed to define two bearer types. One is referred to as LWA split bearer and the other is referred to as LWA switched bearer. In the switched bearer mode, all u-plane PDCP PDUs are forwarded from the eNB to the WiFi part and provided to the UE over the WiFi radio link. In the split bearer mode, similar to the above, u-plane PDUs are distributed between the LTE radio link and the WiFi link, i.e. a branch from the LTE part to the WiFi part is established for the u-plane PDUs. However, it is to be noted that the LTE part, i.e. the eNB, is responsible for LTE control-plane (i.e. RRC messages).

Examples of embodiments are related to a configuration where a specific dual-connectivity (or multi-connectivity) switched mode (also referred to as switched bearer mode) is activated with the aim of extending the support of a given communication capability or function (such as MEC, security scheme support, or slice support referred to hereinafter again as slice A) in scenarios with non-homogeneous support (i.e. as described in connection with FIG. 1, for example). That is, the usage of a certain network function or communication capability (referred to hereinafter sometimes as slice A) which is associated with a source cell (such as cell 21 in FIG. 1) can be still provided when the UE (i.e. one of the sA-UEs 10, 12, 13, for example) transits from the coverage area of the source cell to a target cell which does not provide such a communication capability support (such as to cell 23), wherein a connection switch concerns a change from a former communication form (e.g. "single" connectivity connection) to a DC/MC communication involving the source and target cells. The examples below will be given for the case that the network capability to use in the target cell is a given network slice, slice A. However, they are only illustrative and do not limit the present invention in any way.

For example, according to examples of embodiments, a source cell, such as gNB 1 20 of cell 21, sends a request to a target cell, e.g. to gNB 2 22 of cell 23, for starting a switched bearer mode for communication capability continuity (e.g. slice-continuity) in order to setup DC (or MC in case more than one source/target cells are involved) with gNB 2 22. For example, the gNB 2 22 shall act as SCell in the DC communication. The gNB 2 22 (i.e. the SCell) serves the UE through its radio interface (e.g. Uu) and transmits the data packets associated with, which are forwarded from the source cell (i.e. the gNB 1 20) over an interface between the gNBs, such as an Xn/X2 interface. In this case, according to examples of embodiments, the UE can stop monitoring both u-plane and c-plane connections of the source cell and source cell is used only for the forwarding of u-plane data through the network interface rather than air-interface provisioning. It is to be noted that the DC/MC configuration can be associated with a validity timer, so that the DC/MC communication can be released if no communication capability supporting (slice-supporting) cell is identified within the time period defined by the validity timer.

That is, in other words, according to some examples of embodiments, in the DC/MC switched mode, the target cell (set as e.g. SCell) serves the UE through its radio interface (e.g. Uu) and transmit the data packets associated with or benefiting from the given network or communication capability (e.g. packets belonging to a slice or packets requiring MEC processing) forwarded from the source cell (set as e.g. MCell) over the Xn/X2 interface. The DC/MC switched mode according to examples of embodiments includes also that the UE stops monitoring both u-plane and c-plane connections of the source cell (allowing that the UE can be out of the coverage area of the source cell). This means that the source cell is used only for the forwarding of u-plane data through the network interface while the air interface to the UE is not used.

According to examples of embodiments, the DC/MC mode of switched bearers includes the switching of DRBs and potentially SRBs (e.g. from the "supporting cell" to "cell with no support"). For achieving this, for example, a SCG split bearer can be established where the SCG with no MCG RRC or a MCG split bearer with no MCG RRC can be established, as described below.

Figure 8:
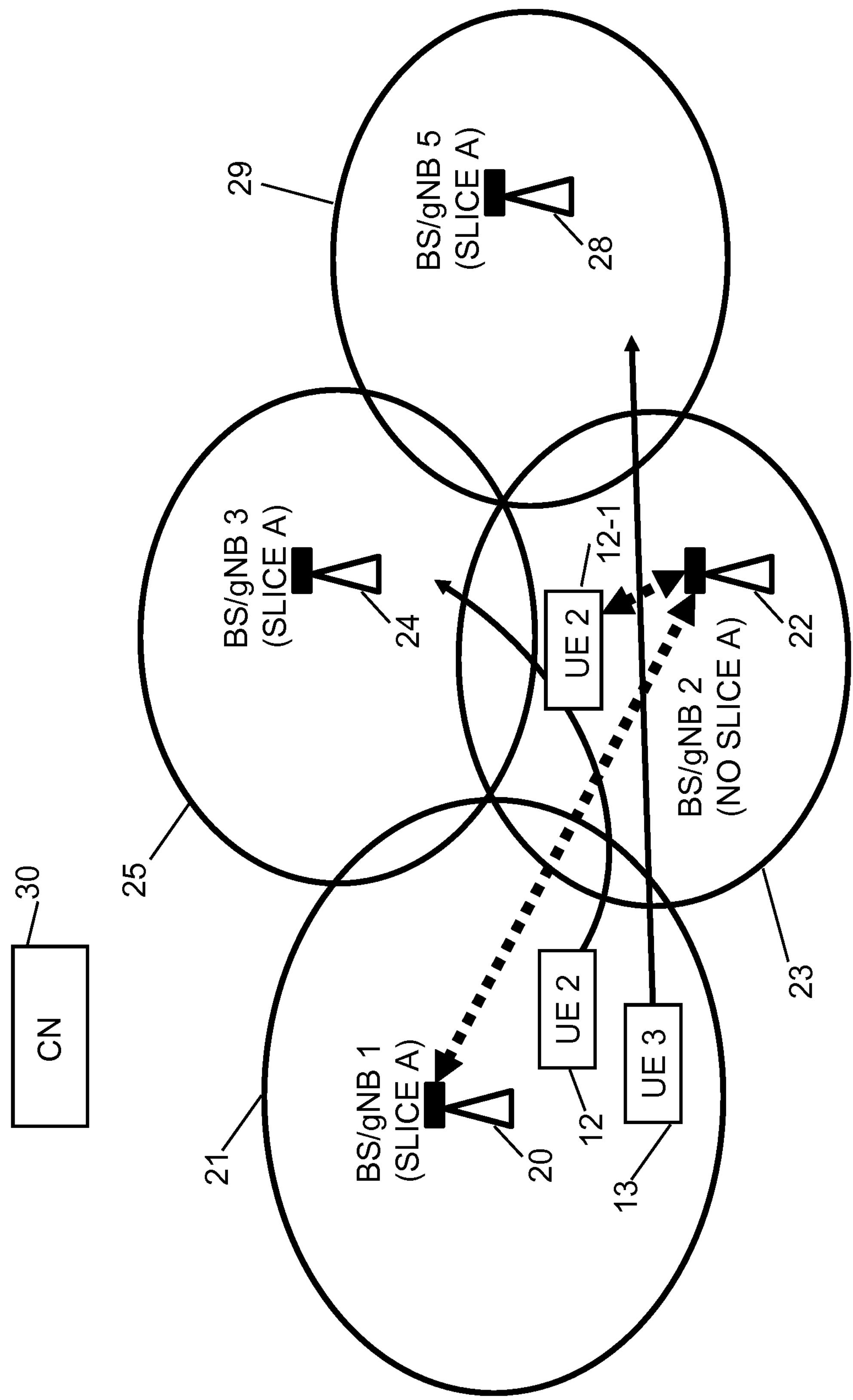
FIG. 8 shows a diagram illustrating a further example of a non-homogenous network scenario for explaining further examples of embodiments.
Figure 9:
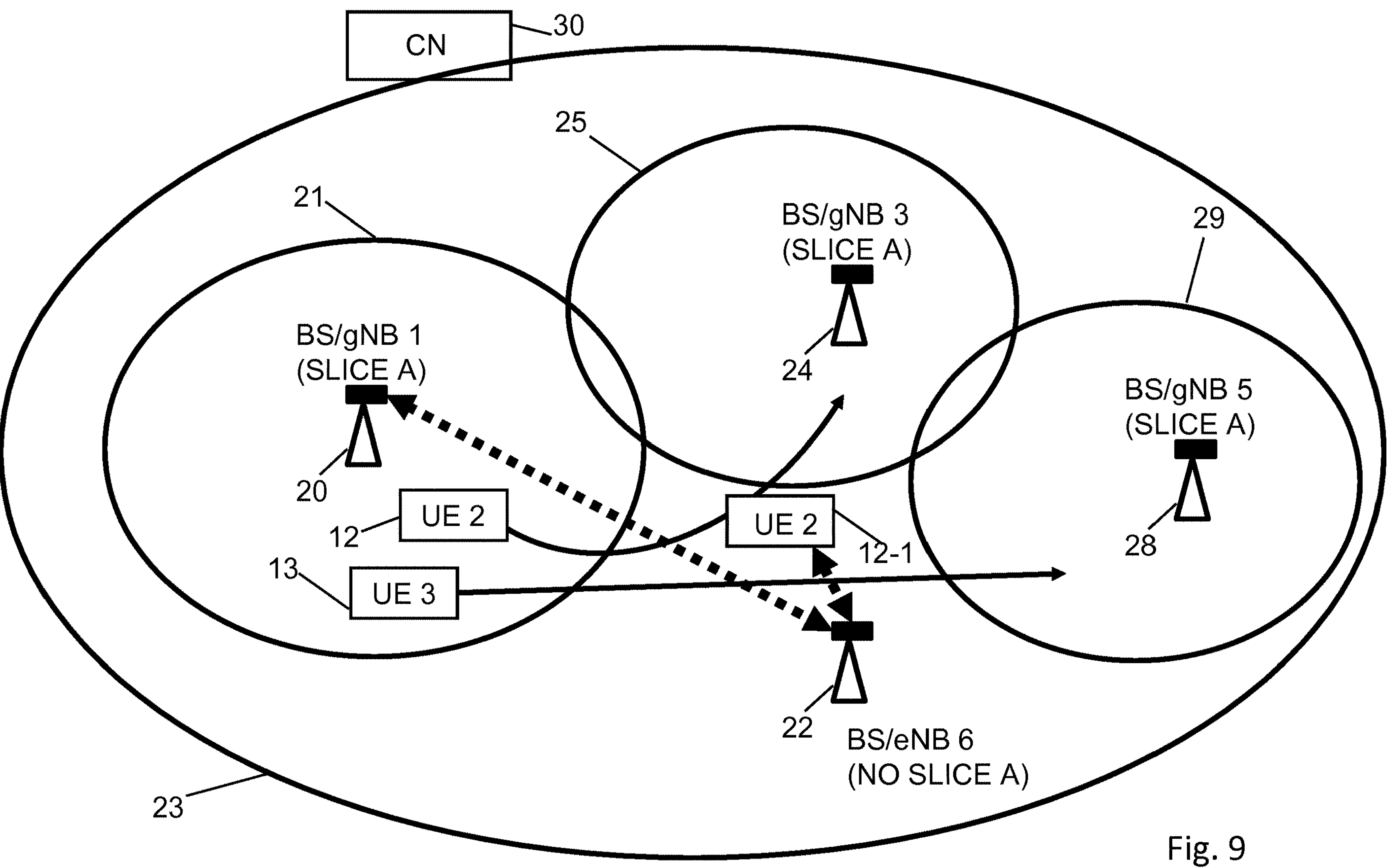
FIG. 9 shows a diagram illustrating a further example of a non-homogenous network scenario for explaining further examples of embodiments.

FIGS. 8 and 9 show respective diagrams illustrating an example of a non-homogenous network scenario for explaining examples of embodiments. For example, FIG. 8 shows a case where a MCG split bearer with no MCG RRC (or a switched mode via SCG) in a NR-NR DC configuration is employed, while FIG. 9 shows a case where a SCG split bearer with no SCG RRC (or SCG switched mode) in an EN-DC configuration is employed.

FIG. 8 shows a simplified network part similar to that of FIG. 1, wherein a further cell 29 as an additional network area is provided which is controlled by a BS or gNB 5 28. In the example of FIG. 8, it is assumed that cell 29 supports slice A (i.e. the communication capability or slice used by the sA-UEs), i.e. it is similar to cell 21 and 25. Furthermore, for the sake of simplicity, two sA-UEs are indicated, i.e. UE 12 and UE 13, wherein UE 12 is assumed to go to a cell 25 supporting the slice A, while UE 13 is assumed to go to cell 29 supporting the slice A.

According to examples of embodiments, the service of the communication capability or function (e.g. slice A), which is not provided in gNB 2 22, is extended when the sA-UEs (e.g. UE 12 and UE 13) move along paths shown by arrows in FIG. 8 through the network area of gNB 2 22.

Specifically, according to examples of embodiments, in the source cell initially provisioning the given slice A to the UEs (i.e. cell 21), the gNB 1 20 which supports slice A (or another communication capability or function, such as MEC etc.) is aware of gNB 2's 22 lack of slice (or communication capability) support and the need for communication capability or slice continuity. It is to be noted that in cell 23, which does not support the slice (communication capability) support, gNB 2 22 may or may not be deployed on the same carrier frequency as gNB 1 20.

When the sA-UE (e.g. UE 2 12) moves away from cell 21 (i.e. gNB 1 20 coverage) to cell 23 (i.e. gNB 2 22 coverage), the source cell (i.e. gNB 1 20), which is aware of gNB2's lack of slice A support, sends an indication to conduct a DC (or MC) switched mode, e.g. by means of a SCell Addition Preparation message, to gNB 2 22 and requests a switched bearer mode for communication capability continuity to setup DC with gNB 2 22 as SCell.

It is to be noted that this according to some examples of embodiments, the indication to conduct a DC (or MC) switched mode is provided by first indicating to the target cell that a connection switching (e.g. a handover) for the UE is to be conducted and that in the course of the handover a DC/MC communication is to be established (i.e. a switched/split bearer is to be established), or it is provided by first establishing the DC/MC communication and then giving the connection to the UE to the second cell.

For example, when configuring switched bearers via SCG, the gNB 1 20 sends the SCell Addition Preparation for the PDU session corresponding to NSSAI to gNB 2 22 with the switch bearer mode for communication capability (slice) continuity request to setup dual connectivity with gNB 2 22 as SCell. For example, gNB 2 22 is selected based on measurement reporting from the UE 12 which indicate gNB 2 22 as best neighbor cell, wherein a determination is made by the gNB 1 20 that the UE 12 moves towards a network area with no cells supporting the required communication capability or function (e.g. the area covered only be the cell 23). Furthermore, the gNB 1 20 establishes appropriate Xn resources for data transmission to the gNB 2 22. It is to be noted that this signaling is effected, for example, by sending corresponding IEs being e.g. part of a S-NODE Addition Request/S-NG-RAN node Addition Preparation message over Xn.

The gNB 2 22 when receiving the indication to conduct a DC (or MC) switched mode, does not establish a connection to a UPF (e.g. a 5GC-N3 connection) for the slice A, i.e. no path switch will be performed to avoid any service interruption. By means of this, a case is facilitated where the transition to a cell with no communication capability (slice) support is temporary. Furthermore, the gNB 2 22 responds to gNB 1 20 with an acknowledgement such as a SCell Addition Preparation Ack and confirms that the mode for the switched SCG bearer including the related configuration is set.

Then, the gNB 2 22 reserves resources being appropriately to (temporarily) support the QoS profile/5QI of the traffic entirely, i.e. the switched bearer mode is such that gNB 2 22 serves the UE 12 such that all data for the UE are transmitted without the assistance of any other cell (in particular the cell with which the DC communication is established), i.e. without Uu's transmissions from the other cell involved in DC (here cell 21). Moreover, the gNB 2 22 stores the communication capability specific configuration provided by gNB 1 20.

Hence, according to examples of embodiments, in the switched SCG bearer mode discussed above, the connection of the UE 12 is configured as follows (for illustrative purpose, FIG. 8 shows with reference sign 12-1 a situation where the UE 12 is located in the cell 23, wherein dashed arrows show the connection path of the UE 12 to the network when using slice A). The MCG is gNB 1 20 (i.e. the communication network control element or function of the source cell 21), which forwards all packets to the SCG (i.e. the communication network control element or function of the source cell 21) e.g. via Xn as received from the CN. It is to be noted that gNB 1 20 is not able to send any packet on its leg to the UE 12-1 over Uu since UE 12-1 is out of coverage. Hence, the UE 12 does not monitor gNB 1's user plane or the control plane (RRC) thereof. Nevertheless, the UE 12 uses gNB 1's security keys as in a conventional DC procedure to decode packets received from gNB 2 22. The SCG is represented by gNB 2 22 which serves entirely the UE's traffic. Hence, the UE 12 monitors u-plane and c-plane from gNB 2 22.

It is to be noted that according to examples of embodiments, gNB1's interface to the UE (e.g. Uu) is not used when the DC switched mode is established since the UE 12 is already or will be soon out of its coverage area. Thus, an approaching RLF from a radio side can be avoided.

As indicated above, according to further examples of embodiments, the DC (or MC) configuration can be associated with a validity timer. The object of the validity timer is to define a point of time when the DC/MC mode is to be released in case no communication capability supporting cell is identified within this time (for example, in case the period in which the UE stays in cell 23 is too long). It is also possible to relate a release of the DC/MC mode to other events, e.g. when a release is triggered by the higher layers of the slice. When the release of the DC/MC mode is to be effected, for example, an SCG bearer or a handover to gNB 2 22 can be initiated.

In the above described example, switched bearers via SCG are described. In the following, an alternative related to MCG split bearer with no MCG RRC is discussed.

According to examples of embodiments, the source cell gNB 1 20 sends a handover request to the target cell gNB 2 22. This handover request contains all information about the communication capabilities or functions used by the UE including a request for a communication capability continuity using dual/multi-connectivity.

The target cell gNB 2 22 checks whether its lower layers can support the communication capability. If this is the case, the gNB 2 22 responds to the HO request with a request to the source cell gNB 1 20 to configure a split bearer for the sake of communication capability continuity.

By receiving the request from gNB 2 22 including an indication of support of communication capability continuity, the source cell gNB 1 20 configures a split bearer with gNB 2 22 as MCG to the UE 12. The configuration includes "switched SRBs" indicating to the UE that all RRC signaling will be received via MCell (which is the gNB 2 22), i.e. no RRC will be received via SCell (which is the gNB 1 20), and "switched DRBs" indicating that the gNB 1 20 it will not send any packets on its leg. The configuration could be provided as part of the handover command to the UE, for example (e.g. by RRC Reconfiguration).

Consequently, the UE 12 is only configured with the RRC configuration of the MCG (which is gNB 2 22). This implies in turn that the UE 12 does not need to monitor the gNB 1 20.

It is to be noted that in case a cell supporting the communication capability (e.g. slice A) is detected (such as cell 25 or cell 29), a connection switching (e.g. cell change) will be triggered to this cell (e.g. to gNB 3 24 of cell 25). As part of the cell change, the previously stored communication capability configuration is sent to gNB 3 25. It is to be noted that a corresponding signaling is effected, for example, by sending corresponding IEs being e.g. part of a M-NG-RAN node initiated S-NODE Modification Request over Xn.

FIG. 9, on the other hand, shows a simplified network part similar to that of FIG. 1, wherein a further cell 29 as an additional network area is provided which is controlled by a BS or gNB 5 28. In the example of FIG. 9, it is assumed that cell 29 supports slide A (i.e. the communication capability or function used by the sA-UEs), i.e. it is similar to cell 21 and 25. Furthermore, cell 23 is assumed to be a LTE cell controlled by an eNB (i.e. eNB 6 22). Similar to FIG. 8, two sA-UEs are indicated, i.e. UE 12 and UE 13, wherein UE 12 is assumed to go to a cell 25 supporting the communication capability (i.e. slice A), while UE 13 is assumed to go to cell 29 supporting the communication capability.

As described in connection with FIG. 8, also in the scenario shown in FIG. 9, the network or communication capability (e.g. slice A), which is not provided in eNB 6 22, is extended when the sA-UEs (e.g. UE 12 and UE 13) move along paths shown by arrows in FIG. 9 through the network area of eNB 6 22. Similarly to the above, also in the configuration of FIG. 9, switched bearers via SCG and MCG split bearer with no MCG RRC are usable.

It is to be noted that examples of embodiments based on the operations discussed in connection with FIGS. 8 and 9 can be combined with features of the operation discussed in connection with FIG. 2, for example. That is, a communication capability search mode can be introduced in the above described DC/MC switched mode in order to enable that a change to a communication capability (or slice A) supporting cell can be executed as soon as the sA-UE moves into the coverage area of a corresponding cell (i.e. from cell 23 to any of cells 21, 25 and 29).

By means of the above described examples of embodiments involving the switched mode, it is possible to provide a network based mechanism allowing to retain and extend a communication capability support when a UE moves to a cell with no such support. For instance, this is useful when the communication capability (e.g. MEC, security scheme, slice support) can be assumed to be available only in one RAT (e.g. NR) but not in other systems (e.g. LTE, Wi-Fi). Furthermore, this is useful when the capability (e.g. MEC, slice support) is being deployed within one RAT such that it is not yet available in all sites. Moreover, this is useful when the capability (e.g. MEC/edge computing) is deployed only at limited cells/RAN because of costs reasons.

The proposed switched mode ensures also service continuity and no service interruption (i.e. no change of the PDCP-level security keys nor u-plane path change in the CN is performed as compared to performing a handover). In addition, it also helps guiding the UE to find a suitable cell with communication capability support quicker, which is controlled by the network. Consequently, the DC/MC switched mode allows that the cell with communication capability support can be retained although no Uu can be offered due to lack of coverage. Thus, by means of the proposed mechanism, communication capability specific services can be maintained in non-homogenous support scenarios, or it is at least possible to bridge for some time the service continuity by using DC or MC.

Figure 10:
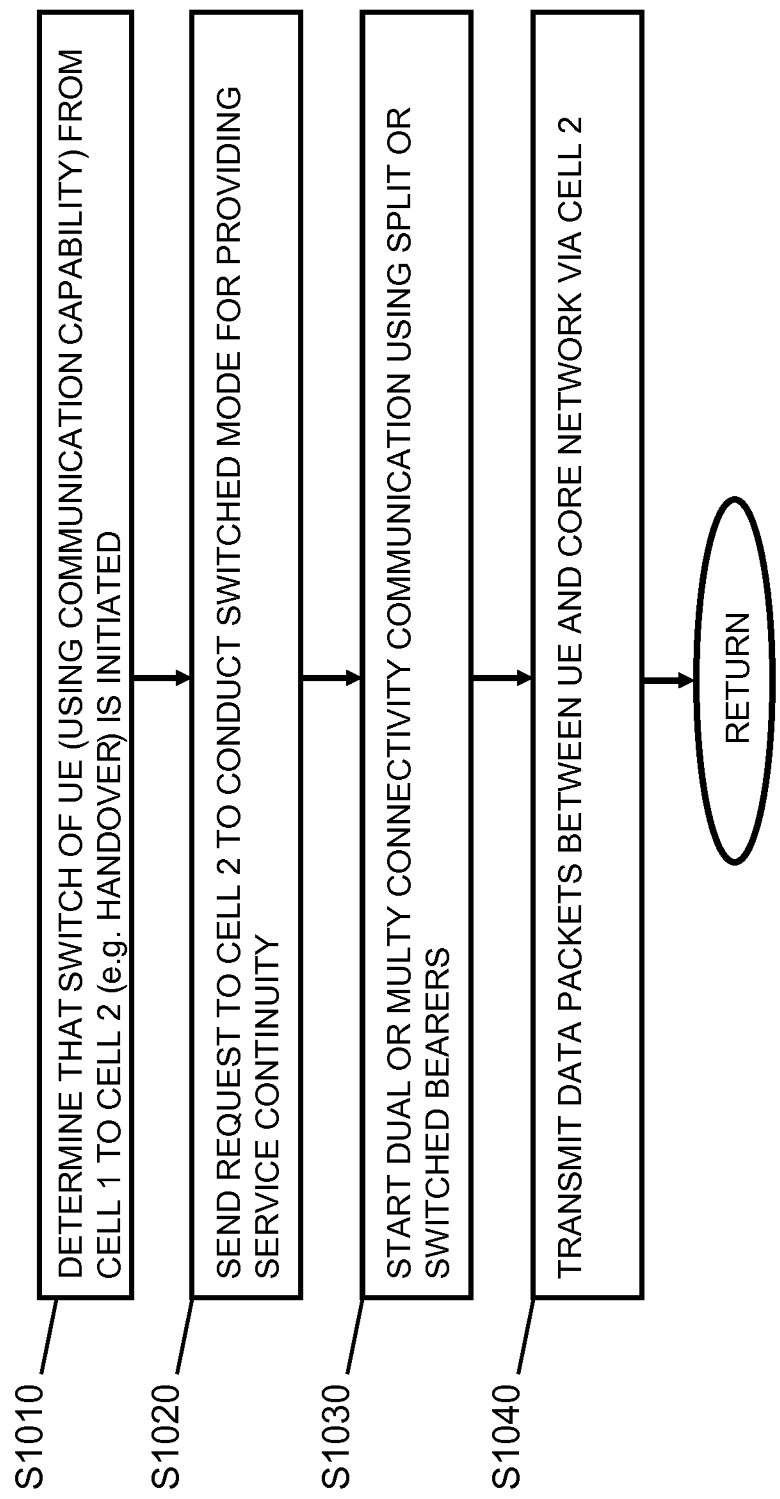
FIG. 10 shows a flow chart of a processing executed by a communication network control element or function of a source cell according to some examples of embodiments.

FIG. 10 shows a flow chart of a processing executed by a communication network control element or function of a source cell (such as gNB 20 of FIG. 8 or 9) which controls a communication connection of at least one communication element or function in a network area or cell providing a specific communication capability or function (e.g. slice A) according to some examples of embodiments.

In S1010, it is determined that a communication element or function (i.e. a UE or the like) communicating in the first network area (i.e. cell 21) and using the specific communication capability or slice (i.e. the UE is a sA-UE) enters at least one second network area which does not provide the specific communication capability or slice (i.e. cell 23), wherein a switching of the communication connection to the second network area is initiated. That is, it is determined in the gNB 20, for example, that a handover or the like of the UE from the currently serving cell (e.g. cell 21 of gNB 20) is to be conducted (e.g. due to be out of coverage), wherein the gNB 20 may either initiate the handover already (i.e. the handover request is sent first), or the determination is processed only internally (i.e. the gNB 20 initiates a DC/MC connection to the UE via a target cell (e.g. cell 23) for service continuity).

In S1020, a request is sent to at least one second communication network control element or function configured to control a communication connection of the communication element or function in the at least one second network area (i.e. to gNB 2 22 or eNB 6 22), to conduct a switched mode for providing service continuity for the communication element or function using the specific communication capability or function by starting a dual or multi connectivity communication. As indicated above, this can be done in context with a handover procedure or a DC/MC establishment procedure.

In S1030, a dual or multi connectivity communication is started for the switched mode. Specifically, the requested switched mode involves that at least one split or switched bearer is established to the communication element or function by the at least one second communication network control element or function via which the communication element or function communicates with the network.

In S1040, data traffic for the continued service using the specific communication capability or function is transmitted to or from the communication element of function from or to the first communication network control element or function via the at least one second communication network control element or function using the at least one split or switched bearer.

According to some examples of embodiments, when requesting the switched mode, a secondary cell addition preparation request is sent to the at least one second communication network control element or function (i.e. gNB 2 22) for setting up a dual or multi connectivity communication with the second communication network control element or function as a secondary cell. Then, configuration information of the communication element or function related to the specific communication capability or function is provided to the at least one second communication network control element or function. Furthermore, suitable resources for data traffic transmission via an interface between the first communication network control element or function and the second communication network control element or function (e.g. Xn) are prepared. Moreover, data packets are transmitted between the communication element or function and a core network via the interface between the first communication network control element or function and the second communication network control element or function.

Alternatively, when requesting the switched mode, a handover request is sent to the second communication network control element or function including configuration information of the communication element or function related to the specific communication capability or function. Furthermore, a request for providing service continuity by using dual or multi connectivity communication is sent. Then, a request from the second communication network control element or function to configure a split bearer for service continuity is received and processed. A split bearer of the communication element or function is configured, with the second communication network control element or function acting as a master cell, wherein the communication element or function (i.e. the UE) is instructed to stop monitoring user and control planes of the first communication network control element or function. Suitable resources for data traffic transmission via an interface between the first communication network control element or function and the second communication network control element or function are prepared. Then, data packets are transmitted between the communication element or function and a core network via the network interface between the first communication network control element or function and the second communication network control element or function.

According to some further examples of embodiments, a validity timer indicating a timing when the dual or multi connectivity communication for providing service continuity is to be terminated in the at least one second network area is set. The validity timer is provided to the at least one second communication network control element or function.

Furthermore, according to some examples of embodiments, the requested switched mode involves that the first communication network control element or function of the first network area is set as a master cell group and one second communication network control element or function of the at least one second network area is set as a secondary cell group, or that one second communication network control element or function of the second network area is set as a master cell group and the first communication network control element or function of first network area and other second communication network control elements or functions are set as a secondary cell group.

Figure 11:
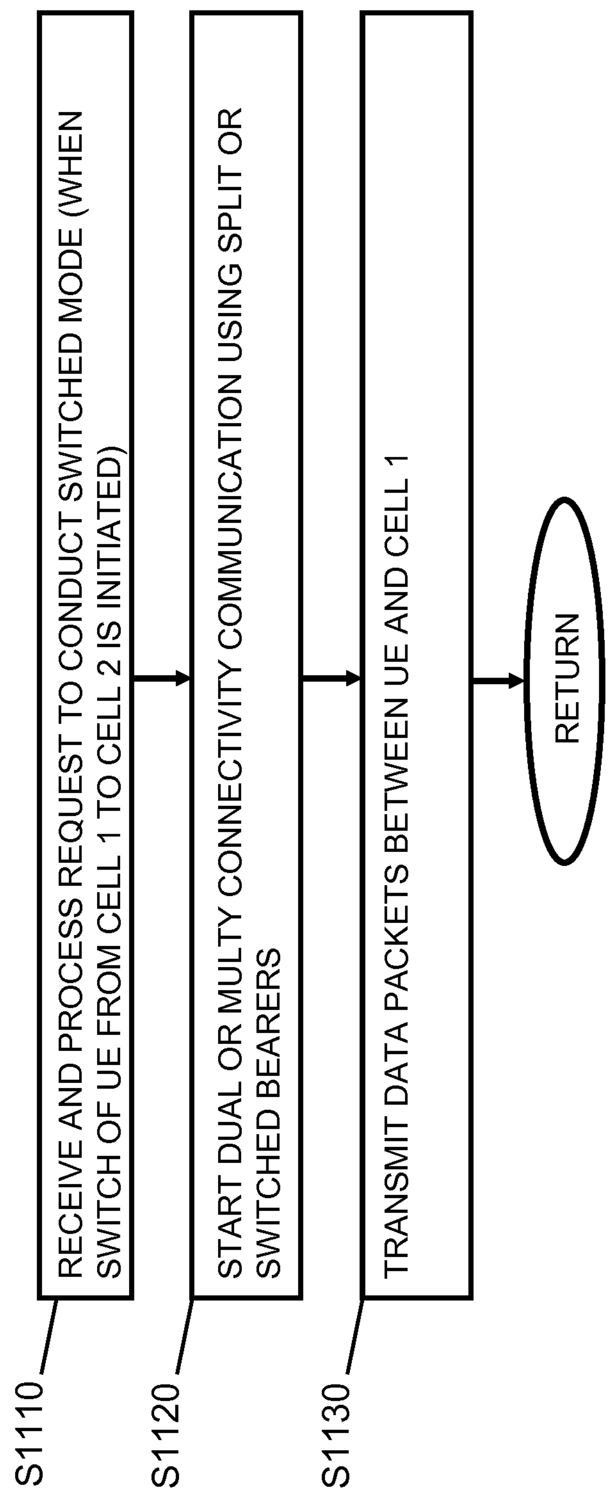
FIG. 11 shows a flow chart of a processing executed by a communication network control element or function of a target cell according to some examples of embodiments.

FIG. 11 shows a flow chart of a processing executed by a communication network control element or function of a target cell (such as gNB 2 22 of FIG. 8 or eNB 6 22 of FIG. 9) which controls a communication connection of at least one communication element or function in a network area or cell which does not provide a specific communication capability or function (e.g. slice A) according to some examples of embodiments.

In S1110, in case a communication element or function using the specific communication capability or function enters from a first network area providing the specific communication capability or function (e.g. cell 21) into the second network area (e.g. cell 23) and a switching the communication connection to the second network area is initiated, a request from a first communication network control element or function configured to control a communication connection of the communication element or function in the first network area is received and processed, wherein the request is to conduct a switched mode for providing service continuity for the communication element by starting a dual or multi connectivity communication.

In S1030, a dual or multi connectivity communication is started for the switched mode. The switched mode involves that at least one split or switched bearer is established to the communication element or function by the second communication network control element or function via which the communication element or function communicates with the network.

In S1130, data traffic for the continued service using the specific communication capability or function is transmitted to or from the communication element of function from or to the first communication network control element or function via the second communication network control element or function using the at least one split or switched bearer.

According to some further examples of embodiments, when requesting the switched mode, a secondary cell addition preparation request is received from the first communication network control element or function and processed for setting up a dual or multi connectivity communication with the second communication network control element or function as a secondary cell. In addition, configuration information of the communication element or function related to the specific communication capability or function is received from the first communication network control element or function, and stored. Moreover, suitable resources for data traffic transmission via an interface (e.g. Xn) between the first communication network control element or function and the second communication network control element or function are prepared. An establishment of a connection to a user plane function for the specific communication capability and the function is prevented for avoiding a path switch. Then, the switched mode is confirmed to the first communication network control element or function, and communication resources via a radio interface towards the communication network or function for providing traffic data related to the specific communication capability or function are reserved. Furthermore, the data traffic of the communication element or function is served by forwarding data packets between the communication element or function and a core network via the interface between the first communication network control element or function and the second communication network control element or function.

Alternatively, according to some further examples of embodiments, when requesting the switched mode, a handover request is received from the first communication network control element or function including configuration information of the communication element or function related to the specific communication capability or function and processed. In addition, a request for providing service continuity by using dual or multi connectivity communication is received and processed. Next, when service continuity can be supported, the handover request is responded by transmitting a request to the first communication network control element or function to configure a split or switched bearer for service continuity. A split or switched bearer is established with the communication element or function where the second communication network control element or function acting as a master cell. Moreover, suitable resources for data traffic transmission via an interface between the first communication network control element or function and the second communication network control element or function are prepared. The data traffic of the communication element or function is served by forwarding data packets between the communication element or function and a core network via the interface between the first communication network control element or function and the second communication network control element or function.

Furthermore, according to some further examples of embodiments, information indicating a validity timer indicating a timing when the dual or multi connectivity communication for providing service continuity is to be terminated in the second network area is received and processed. The dual or multi connectivity communication with the communication element or function is terminated when the timer expires, by conducting a handover to the second communication network control element or function.

Moreover, according to some further examples of embodiments, in case it is determined that the communication element or function enters from the second network area (i.e. cell 23) into another network area providing the specific communication capability or function (e.g. cell 25), switching of the communication connection to the other network area is initiated. In this case, configuration information of the communication element or function related to the specific communication capability or function is provided to a communication network control element or function of the other network area (e.g. to gNB 3 24). Then, the switched mode is terminated when the switching of the communication connection to the other network area is completed.

According to some further examples of embodiments, a communication capability search mode indication for informing the second communication network control element or function to set the communication element or function into a communication capability search mode is received and processed. In the communication capability search mode, a further switching of the communication connection to another network area providing the specific communication capability or function is accelerated.

According to some further examples of embodiments, the switched mode involves that the first communication network control element or function of the first network area is set as a master cell group and one second communication network control element or function of the at least one second network area is set as a secondary cell group, or that one second communication network control element or function of the second network area is set as a master cell group and the first communication network control element or function of first network area and other second communication network control elements or functions are set as a secondary cell group.

Figure 12:
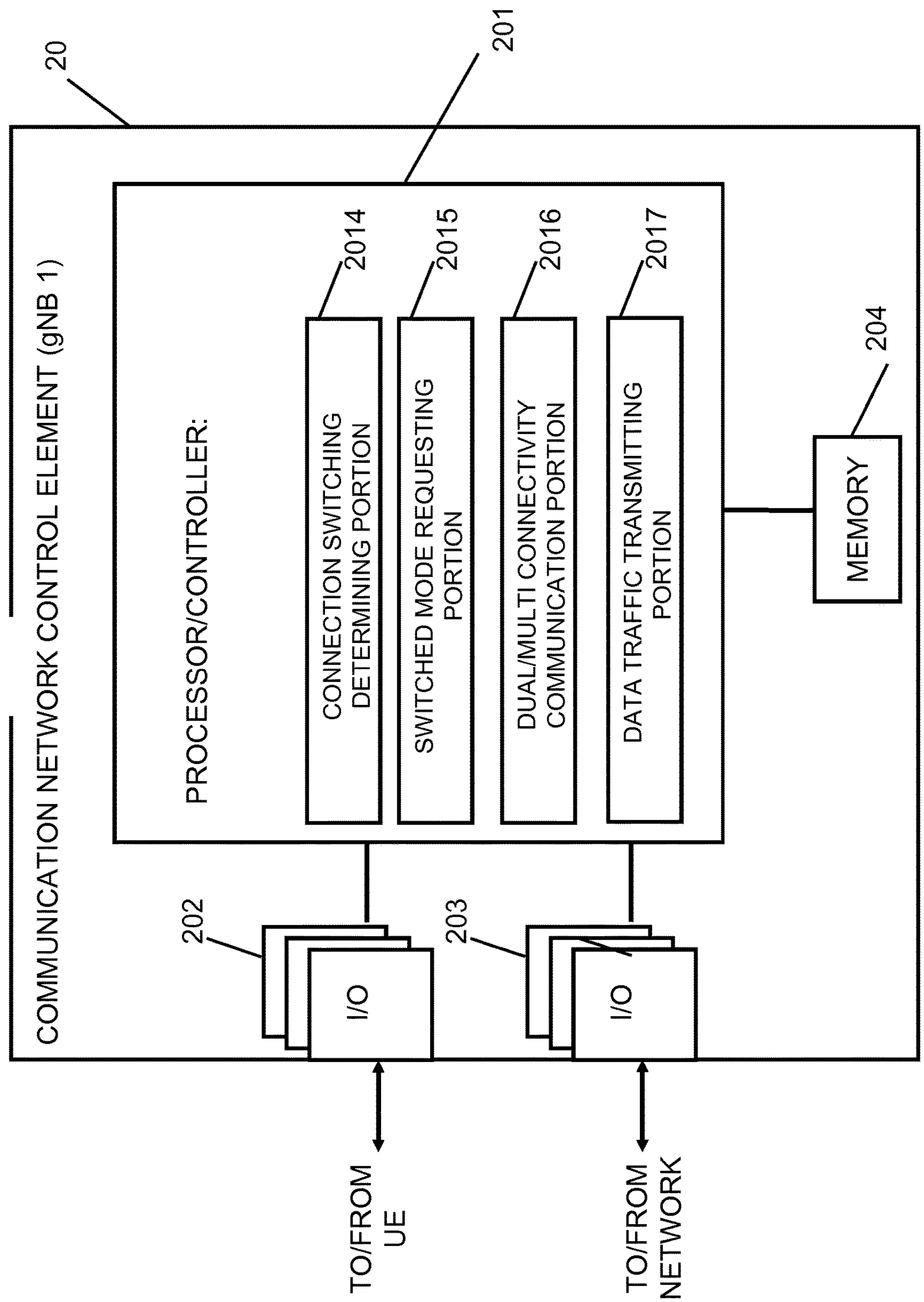
FIG. 12 shows a diagram of a network element or function acting as a communication network control element or function of a source cell according to some examples of embodiments.

FIG. 12 shows a diagram of a network element or function acting as a communication network control element or function controlling a source cell according to some examples of embodiments, i.e. the gNB 20 of FIG. 8 or 9, which is configured to conduct a communication connection control procedure as described in connection with some of the examples of embodiments. It is to be noted that the communication network control element or function, like the gNB 20 of FIG. 8 or 9, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element like the gNB 20 shown in FIG. 12 may include a processing circuitry, a processing function, a control unit or a processor 201, such as a CPU or the like, which is suitable for executing instructions given by programs or the like related to the communication connection control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with the communication element or function like the UEs 10, 12, 13, as described in connection with FIGS. 8 and 9, for example. The I/O units 203 may be used for communicating with the network, like the CN 30 or other gNBs, as described in connection with FIGS. 8 and 9, for example. The I/O units 202 and 203 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described communication connection control processing. In particular, the processor or processing circuitry or function 201 includes one or more of the following sub-portions. Sub-portion 2014 is a processing portion which is usable as a portion for determining a (future) connection switching (handover) of the UE. The portion 2014 may be configured to perform processing according to S1010 of FIG. 10. Furthermore, the processor or processing circuitry or function 201 may include a sub-portion 2015 usable as a portion for requesting the switched mode. The portion 2015 may be configured to perform a processing according to S1020 of FIG. 10. In addition, the processor or processing circuitry or function 201 may include a sub-portion 2016 usable as a portion for conducting a dual or multi connectivity communication. The portion 2016 may be configured to perform a processing according to S1030 of FIG. 10. Furthermore, the processor or processing circuitry or function 201 may include a sub-portion 2017 usable as a portion for transmitting data traffic in the switched mode. The portion 2017 may be configured to perform a processing according to S1040 of FIG. 10.

Figure 13:
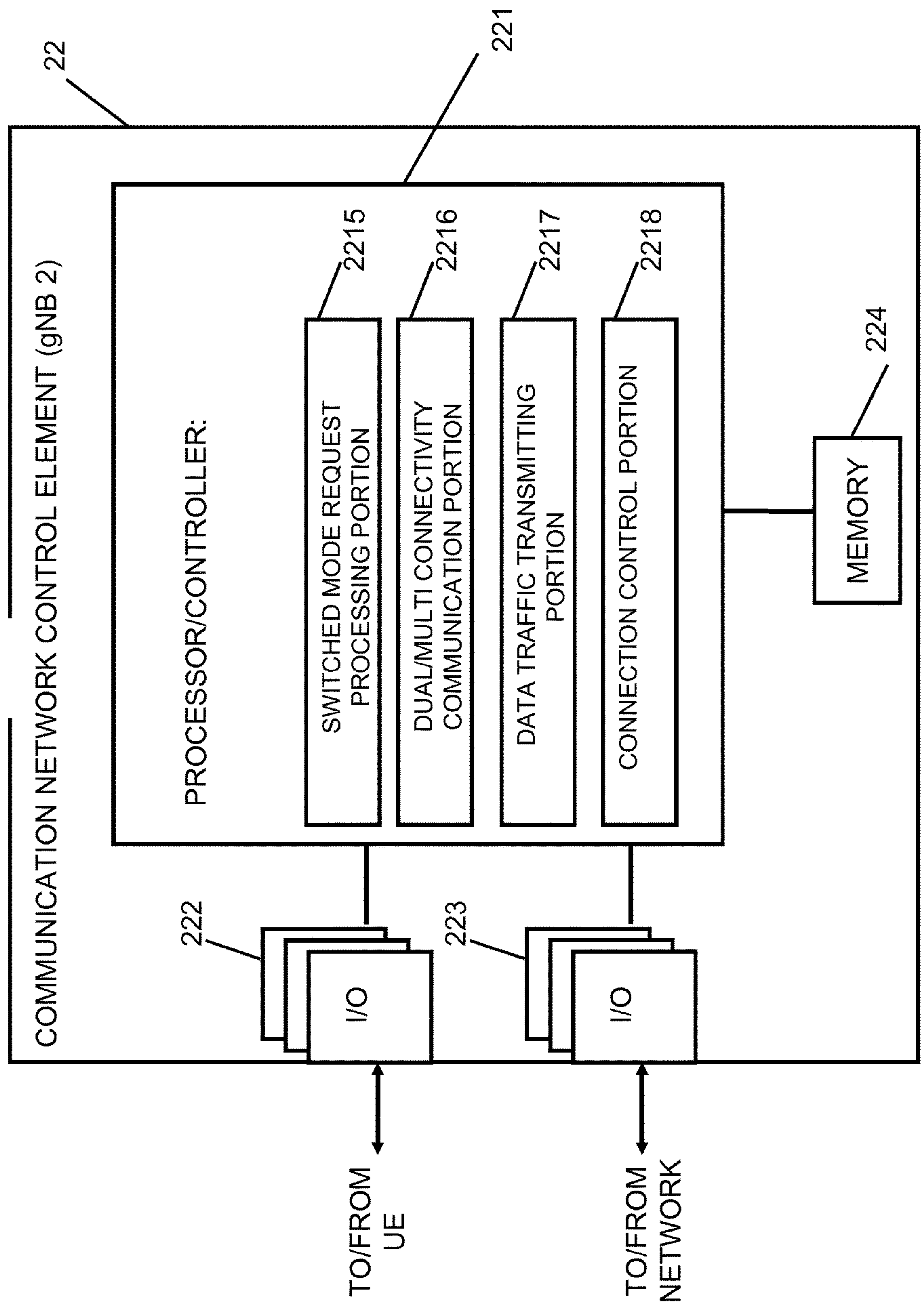
FIG. 13 shows a diagram of a network element or function acting as a communication network control element or function of a target cell according to some examples of embodiments.

FIG. 13 shows a diagram of a network element or function acting as a communication network control element or function controlling a target cell according to some examples of embodiments, i.e. the gNB 22 of FIG. 8 or the eNB 6 22 of FIG. 9, which is configured to conduct a communication connection control procedure as described in connection with some of the examples of embodiments. It is to be noted that the communication network control element or function, like the gNB 22 of FIG. 8 or the eNB 6 22 of FIG. 9, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element like the gNB 22 shown in FIG. 13 may include a processing circuitry, a processing function, a control unit or a processor 221, such as a CPU or the like, which is suitable for executing instructions given by programs or the like related to the communication connection control procedure. The processor 221 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 222 and 223 denote input/output (I/O) units or functions (interfaces) connected to the processor or processing function 221. The I/O units 222 may be used for communicating with the communication element or function like the UEs 10, 12, 13, as described in connection with of FIG. 8 or 9, for example. The I/O units 223 may be used for communicating with the network, like the CN 30 or other gNBs, as described in connection with of FIG. 8 or 9, for example. The I/O units 222 and 223 may be a combined unit including communication equipment towards several entities, or may include a distributed structure with a plurality of different interfaces for different entities. Reference sign 224 denotes a memory usable, for example, for storing data and programs to be executed by the processor or processing function 221 and/or as a working storage of the processor or processing function 221. It is to be noted that the memory 224 may be implemented by using one or more memory portions of the same or different type of memory.

The processor or processing function 221 is configured to execute processing related to the above described communication connection control processing. In particular, the processor or processing circuitry or function 221 includes one or more of the following sub-portions. Sub-portion 2215 is a processing portion which is usable as a portion for processing a switched mode request. The portion 2215 may be configured to perform processing according to S1110 of FIG. 11. Furthermore, the processor or processing circuitry or function 221 may include a sub-portion 2216 usable as a portion for conducting a dual or multi connectivity communication. The portion 2216 may be configured to perform a processing according to S1120 of FIG. 11. In addition, the processor or processing circuitry or function 221 may include a sub-portion 2217 usable as a portion for transmitting data traffic, and a sub-portion 2218 usable as a portion for conducting a connection control. The portions 2217 and 2218 may be configured to perform a processing according to S1130 of FIG. 11.

It is to be noted that examples of embodiments of the invention are applicable to various different network configurations. In other words, the examples shown in the above described figures, which are used as a basis for the above discussed examples, are only illustrative and do not limit the present invention in any way. That is, additional further existing and proposed new functionalities available in a corresponding operating environment may be used in connection with examples of embodiments of the invention based on the principles defined.

According to a further example of embodiments, there is provided, for example, an apparatus for use by a first communication network control element or function configured to control a communication connection of at least one communication element or function in a first network area providing a specific communication capability or function, the apparatus comprising means for determining that a communication element or function communicating in the first network area and using the specific communication capability or function enters a second network area which does not provide the specific communication capability or function and that there is a switching of the communication connection to the second network area, and means for causing sending of connection switching information related to the switching of the communication connection of the communication element or function to a second communication network control element or function configured to control a communication connection of the communication element or function in the second network area, wherein the information comprises a communication capability search mode indication for informing the second communication network control element or function to set the communication element or function into a communication capability search mode in which a connected mode of the communication element or function is maintained and a further switching of the communication connection to another network area providing the specific communication capability or function is accelerated.

Furthermore, according to some other examples of embodiments, the above defined apparatus may further comprise means for conducting at least one of the processing defined in the above described methods, for example a method according that described in connection with FIG. 3.

According to a further example of embodiments, there is provided, for example, an apparatus for use by a second communication network control element or function configured to control a communication connection of at least one communication element or function in a second network area which does not provide a specific communication capability or function, the apparatus comprising means for determining a connection switching of a communication connection to the second network area by a communication element or function using the specific communication capability or function in the first network area, means for obtaining and processing connection switching information related to a switching of the communication connection of the communication element or function from a first communication network control element or function configured to control a communication connection of the communication element or function in the first network area, wherein the information comprises a communication capability search mode indication for informing to set the communication element or function into a communication capability search mode in which a connected mode of the communication element or function is maintained and a further switching of the communication connection to another network area providing the specific communication capability or function is accelerated, and configuring the communication element or function for a communication connection in the second network area on the basis of the connection switching information comprising the communication capability search mode indication.

Furthermore, according to some other examples of embodiments, the above defined apparatus may further comprise means for conducting at least one of the processing defined in the above described methods, for example a method according that described in connection with FIG. 4.

According to a further example of embodiments, there is provided, for example, an apparatus for use by a communication element or function configured to establish a communication connection in a network area providing a specific communication capability or function, the apparatus comprising means for receiving and processing, when a switching of communication connection from the first network area to a second network area which does not provide a specific communication capability or function is conducted, an indication that the communication element or function is set in a communication capability search mode in which a connected mode of the communication element or function is maintained and a further switching of the communication connection to another network area providing the specific communication capability or function is accelerated, and means for cancelling requesting in the second network area for a service based on the specific communication capability or function.

Furthermore, according to some other examples of embodiments, the above defined apparatus may further comprise means for conducting at least one of the processing defined in the above described methods, for example a method according that described in connection with FIG. 5.

According to a further example of embodiments, there is provided, for example, an apparatus for use by a first communication network control element or function configured to control a communication connection of at least one communication element or function in a first network area providing a specific communication capability or function, the apparatus comprising means for determining that a communication element or function communicating in the first network area and using the specific communication capability or function enters at least one second network area which does not provide the specific communication capability or function and that a switching of the communication connection to the second network area is initiated, means for causing sending of a request, to at least one second communication network control element or function configured to control a communication connection of the communication element or function in the at least one second network area, to conduct a switched mode for providing service continuity for the communication element or function using the specific communication capability or function by starting a dual or multi connectivity communication, wherein the switched mode involves that at least one split or switched bearer is established to the communication element or function by the at least one second communication network control element or function via which the communication element or function communicates with the network, and data traffic for the continued service using the specific communication capability or function is transmitted to or from the communication element of function from or to the first communication network control element or function via the at least one second communication network control element or function using the at least one split or switched bearer.

Furthermore, according to some other examples of embodiments, the above defined apparatus may further comprise means for conducting at least one of the processing defined in the above described methods, for example a method according that described in connection with FIG. 10.

According to a further example of embodiments, there is provided, for example, an apparatus for use by a second communication network control element or function configured to control a communication connection of at least one communication element or function in a second network area which does not provide a specific communication capability or function, the apparatus comprising means for receiving and processing, in case a communication element or function using the specific communication capability or function enters from a first network area providing the specific communication capability or function into the second network area and switching of the communication connection to the second network area is initiated, a request from a first communication network control element or function configured to control a communication connection of the communication element or function in the first network area to conduct a switched mode for providing service continuity for the communication element by starting a dual or multi connectivity communication, wherein the switched mode involves that at least one split or switched bearer is established to the communication element or function by the second communication network control element or function via which the communication element or function communicates with the network, and data traffic for the continued service using the specific communication capability or function is transmitted to or from the communication element of function from or to the first communication network control element or function via the second communication network control element or function using the at least one split or switched bearer.

Furthermore, according to some other examples of embodiments, the above defined apparatus may further comprise means for conducting at least one of the processing defined in the above described methods, for example a method according that described in connection with FIG. 11.

According to a further example of embodiments, there is provided, for example, a non-transitory computer readable medium comprising program instructions for causing an apparatus to perform at least the following: when being used in a first communication network control element or function configured to control a communication connection of at least one communication element or function in a first network area providing a specific communication capability or function, determining that a communication element or function communicating in the first network area and using the specific communication capability or function enters a second network area which does not provide the specific communication capability or function and that there is a switching of the communication connection to the second network area, and causing sending of connection switching information related to the switching of the communication connection of the communication element or function to a second communication network control element or function configured to control a communication connection of the communication element or function in the second network area, wherein the information comprises a communication capability search mode indication for informing the second communication network control element or function to set the communication element or function into a communication capability search mode in which a connected mode of the communication element or function is maintained and a further switching of the communication connection to another network area providing the specific communication capability or function is accelerated.

According to a further example of embodiments, there is provided, for example, a non-transitory computer readable medium comprising program instructions for causing an apparatus to perform at least the following: when being used in a second communication network control element or function configured to control a communication connection of at least one communication element or function in a second network area which does not provide a specific communication capability or function, determining a connection switching of a communication connection to the second network area by a communication element or function using the specific communication capability or function in the first network area, obtaining and processing connection switching information related to a switching of the communication connection of the communication element or function from a first communication network control element or function configured to control a communication connection of the communication element or function in the first network area, wherein the information comprises a communication capability search mode indication for informing to set the communication element or function into a communication capability search mode in which a connected mode of the communication element or function is maintained and a further switching of the communication connection to another network area providing the specific communication capability or function is accelerated, and configuring the communication element or function for a communication connection in the second network area on the basis of the connection switching information comprising the communication capability search mode indication.

According to a further example of embodiments, there is provided, for example, a non-transitory computer readable medium comprising program instructions for causing an apparatus to perform at least the following: when being used in a communication element or function configured to establish a communication connection in a network area providing a specific communication capability or function, receiving and processing, when a switching of communication connection from the first network area to a second network area which does not provide a specific communication capability or function is conducted, an indication that the communication element or function is set in a communication capability search mode in which a connected mode of the communication element or function is maintained and a further switching of the communication connection to another network area providing the specific communication capability or function is accelerated, and cancelling requesting in the second network area for a service based on the specific communication capability or function.

According to a further example of embodiments, there is provided, for example, a non-transitory computer readable medium comprising program instructions for causing an apparatus to perform at least the following: when being used in a first communication network control element or function configured to control a communication connection of at least one communication element or function in a first network area providing a specific communication capability or function, determining that a communication element or function communicating in the first network area and using the specific communication capability or function enters at least one second network area which does not provide the specific communication capability or function and that a switching of the communication connection to the second network area is initiated, causing sending of a request, to at least one second communication network control element or function configured to control a communication connection of the communication element or function in the at least one second network area, to conduct a switched mode for providing service continuity for the communication element or function using the specific communication capability or function by starting a dual or multi connectivity communication, wherein the switched mode involves that at least one split or switched bearer is established to the communication element or function by the at least one second communication network control element or function via which the communication element or function communicates with the network, and data traffic for the continued service using the specific communication capability or function is transmitted to or from the communication element of function from or to the first communication network control element or function via the at least one second communication network control element or function using the at least one split or switched bearer.

According to a further example of embodiments, there is provided, for example, a non-transitory computer readable medium comprising program instructions for causing an apparatus to perform at least the following: when being used in a second communication network control element or function configured to control a communication connection of at least one communication element or function in a second network area which does not provide a specific communication capability or function, receiving and processing, in case a communication element or function using the specific communication capability or function enters from a first network area providing the specific communication capability or function into the second network area and switching of the communication connection to the second network area is initiated, a request from a first communication network control element or function configured to control a communication connection of the communication element or function in the first network area to conduct a switched mode for providing service continuity for the communication element by starting a dual or multi connectivity communication, wherein the switched mode involves that at least one split or switched bearer is established to the communication element or function by the second communication network control element or function via which the communication element or function communicates with the network, and data traffic for the continued service using the specific communication capability or function is transmitted to or from the communication element of function from or to the first communication network control element or function via the second communication network control element or function using the at least one split or switched bearer.

It should be appreciated that

- an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.
- embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus for use with a first communication network control element or function configured to control a communication connection of at least one communication element or function in a first network area providing a specific communication capability or function, the apparatus comprising:

at least one processing circuitry, and at least one non-transitory memory for storing instructions to be executed by the processing circuitry, wherein the at least one memory and the instructions are configured to, with the at least one processing circuitry, cause the apparatus at least:

to determine that a communication element or function of the at least one communication element or function communicating in the first network area and using the specific communication capability or function enters at least one second network area which does not provide the specific communication capability or function and that a switching of the communication connection to the at least one second network area is initiated, to cause sending of a request, to at least one second communication network control element or function configured to control a communication connection of the communication element or function in the at least one second network area, to conduct a switched mode for providing service continuity for the communication element or function using the specific communication capability or function by starting a dual or multi connectivity communication, wherein the switched mode involves that at least one split or switched bearer is established to the communication element or function with the at least one second communication network control element or function via which the communication element or function communicates with at least one of the first network area or the at least one second network area, and wherein data traffic for the continued service using the specific communication capability or function is transmitted to or from the communication element of function from or to the first communication network control element or function via the at least one second communication network control element or function using the at least one split or switched bearer.

2. The apparatus according to claim 1, wherein the at least one memory and the instructions are further configured to, with the at least one processing circuitry, cause the apparatus at least:

when requesting the switched mode, to send a secondary cell addition preparation request to the at least one second communication network control element or function for setting up a dual or multi connectivity communication with the second communication network control element or function as a secondary cell, to provide to the at least one second communication network control element or function configuration information of the communication element or function related to the specific communication capability or function, to prepare suitable resources for data traffic transmission via an interface between the first communication network control element or function and the second communication network control element or function, and to transmit data packets between the communication element or function and a core network via the interface between the first communication network control element or function and the second communication network control element or function.

3. The apparatus according to claim 1, wherein the at least one memory and the instructions are further configured to, with the at least one processing circuitry, cause the apparatus at least:

when requesting the switched mode, to send a handover request to the second communication network control element or function including configuration information of the communication element or function related to the specific communication capability or function, and a request for providing service continuity with using dual or multi connectivity communication, to receive and process a request from the second communication network control element or function to configure a split or switched bearer for service continuity, to configure a split or switched bearer of the communication element or function with the second communication network control element or function acting as a master cell, and to instruct the communication element or function to stop monitoring user and control planes of the first communication network control element or function, to prepare suitable resources for data traffic transmission via an interface between the first communication network control element or function and the second communication network control element or function, and to transmit data packets between the communication element or function and a core network via the interface between the first communication network control element or function and the second communication network control element or function.

4. The apparatus according to claim 1, wherein the at least one memory and the instructions are further configured to, with the at least one processing circuitry, cause the apparatus at least:

to set a validity timer indicating a timing when the dual or multi connectivity communication for providing service continuity is to be terminated in the at least one second network area, and to provide the validity timer to the at least one second communication network control element or function.

5. The apparatus according to claim 1, wherein the switched mode involves that the first communication network control element or function of the first network area is set as a master cell group and one second communication network control element or function of the at least one second network area is set as a secondary cell group, or that one second communication network control element or function of the at least one second network area is set as a master cell group and the first communication network control element or function of first network area and other second communication network control elements or functions are set as a secondary cell group.

6. An apparatus for use with a second communication network control element or function configured to control a communication connection of at least one communication element or function in at least one second network area which does not provide a specific communication capability or function, the apparatus comprising:

at least one processing circuitry, and at least one non-transitory memory for storing instructions to be executed by the processing circuitry, wherein the at least one memory and the instructions are configured to, with the at least one processing circuitry, cause the apparatus at least:

to receive and process, in case a communication element or function of the at least one communication element or function using the specific communication capability or function enters from a first network area providing the specific communication capability or function into the at least one second network area and switching of the communication connection to the at least one second network area is initiated, a request from a first communication network control element or function configured to control a communication connection of the communication element or function in the first network area to conduct a switched mode for providing service continuity for the communication element by starting a dual or multi connectivity communication, wherein the switched mode involves that:

at least one split or switched bearer is established to the communication element or function with the second communication network control element or function via which the communication element or function communicates with at least one of the first network area or the at least one second network area, and wherein data traffic for the continued service using the specific communication capability or function is transmitted to or from the communication element of function from or to the first communication network control element or function via the second communication network control element or function using the at least one split or switched bearer.

7. The apparatus according to claim 6, wherein the at least one memory and the instructions are further configured to, with the at least one processing circuitry, cause the apparatus at least:

when requesting the switched mode, to receive and process a secondary cell addition preparation request from the first communication network control element or function for setting up a dual or multi connectivity communication with the second communication network control element or function as a secondary cell, to receive, from the first communication network control element or function, and store configuration information of the communication element or function related to the specific communication capability or function, to prepare suitable resources for data traffic transmission via an interface between the first communication network control element or function and the second communication network control element or function, to prevent establishing a connection to a user plane function for the specific communication capability of function for avoiding a path switch, to confirm the switched mode to the first communication network control element or function, to reserve communication resources via a radio interface towards the communication network or function for providing traffic data related to the specific communication capability or function, and to serve the data traffic of the communication element or function with forwarding data packets between the communication element or function and a core network via the interface between the first communication network control element or function and the second communication network control element or function.

8. The apparatus according to claim 6, wherein the at least one memory and the instructions are further configured to, with the at least one processing circuitry, cause the apparatus at least:

when requesting the switched mode, to receive and process a handover request from the first communication network control element or function including configuration information of the communication element or function related to the specific communication capability or function, and a request for providing service continuity with using dual or multi connectivity communication, to respond, when service continuity can be supported, to the handover request with transmitting a request to the first communication network control element or function to configure a split or switched bearer for service continuity, to establish a split or switched bearer with the communication element or function where the second communication network control element or function acting as a master cell, to prepare suitable resources for data traffic transmission via an interface between the first communication network control element or function and the second communication network control element or function, and to serve the data traffic of the communication element or function with forwarding data packets between the communication element or function and a core network via the interface between the first communication network control element or function and the second communication network control element or function.

9. The apparatus according to claim 6, wherein the at least one memory and the instructions are further configured to, with the at least one processing circuitry, cause the apparatus at least:

to receive and process information indicating a validity timer indicating a timing when the dual or multi connectivity communication for providing service continuity is to be terminated in the at least one second network area, and to terminate the dual or multi connectivity communication with the communication element or function when the timer expires with conducting a handover to the second communication network control element or function.

10. The apparatus according to claim 6, wherein the at least one memory and the instructions are further configured to, with the at least one processing circuitry, cause the apparatus at least:

to initiate, in case it is determined that the communication element or function enters from the at least one second network area into another network area providing the specific communication capability of function, switching of the communication connection to the other network area, to provide configuration information of the communication element or function related to the specific communication capability or function to a communication network control element or function of the other network area, and to terminate the switched mode when the switching of the communication connection to the other network area is completed.

11. The apparatus according to claim 10, wherein the at least one memory and the instructions are further configured to, with the at least one processing circuitry, cause the apparatus at least:

to receive and process, from the first communication network control element or function, a communication capability search mode indication for informing the second communication network control element or function to set the communication element or function into a communication capability search mode in which a further switching of the communication connection to another network area providing the specific communication capability or function is accelerated.

12. The apparatus according to claim 6, wherein the switched mode involves that the first communication network control element or function of the first network area is set as a master cell group and one second communication network control element or function of the at least one second network area is set as a secondary cell group, or that one second communication network control element or function of the at least one second network area is set as a master cell group and the first communication network control element or function of first network area and other second communication network control elements or functions are set as a secondary cell group.

13. A method for use in a first communication network control element or function configured to control a communication connection of at least one communication element or function in a first network area providing a specific communication capability or function, the method comprising:

determining that a communication element or function of the at least one communication element or function communicating in the first network area and using the specific communication capability or function enters at least one second network area which does not provide the specific communication capability or function and that a switching of the communication connection to the at least one second network area is initiated, causing to send a request, to at least one second communication network control element or function configured to control a communication connection of the communication element or function in the at least one second network area, to conduct a switched mode for providing service continuity for the communication element or function using the specific communication capability or function with starting a dual or multi connectivity communication, wherein the switched mode involves that at least one split or switched bearer is established to the communication element or function with the at least one second communication network control element or function via which the communication element or function communicates with at least one of the first network area or the at least one second network area, and wherein data traffic for the continued service using the specific communication capability or function is transmitted to or from the communication element of function from or to the first communication network control element or function via the at least one second communication network control element or function using the at least one split or switched bearer.

14. The method according to claim 13, further comprising when requesting the switched mode, sending a secondary cell addition preparation request to the at least one second communication network control element or function for setting up a dual or multi connectivity communication with the second communication network control element or function as a secondary cell, providing to the at least one second communication network control element or function configuration information of the communication element or function related to the specific communication capability or function, preparing suitable resources for data traffic transmission via an interface between the first communication network control element or function and the second communication network control element or function, and transmitting data packets between the communication element or function and a core network via the interface between the first communication network control element or function and the second communication network control element or function.

15. The method according to claim 13, further comprising:

when requesting the switched mode, sending a handover request to the second communication network control element or function including configuration information of the communication element or function related to the specific communication capability or function, and a request for providing service continuity with using dual or multi connectivity communication, receiving and processing a request from the second communication network control element or function to configure a split or switched bearer for service continuity, configuring a split or switched bearer of the communication element or function with the second communication network control element or function acting as a master cell, and instructing the communication element or function to stop monitoring user and control planes of the first communication network control element or function, preparing suitable resources for data traffic transmission via an interface between the first communication network control element or function and the second communication network control element or function, and transmitting data packets between the communication element or function and a core network via the interface between the first communication network control element or function and the second communication network control element or function.

16. The method according to claim 13, further comprising:

setting a validity timer indicating a timing when the dual or multi connectivity communication for providing service continuity is to be terminated in the at least one second network area, and providing the validity timer to the at least one second communication network control element or function.

17. The method according to claim 13, wherein the switched mode involves that the first communication network control element or function of the first network area is set as a master cell group and one second communication network control element or function of the at least one second network area is set as a secondary cell group, or that one second communication network control element or function of the at least one second network area is set as a master cell group and the first communication network control element or function of first network area and other second communication network control elements or functions are set as a secondary cell group.

18. A method for use in a second communication network control element or function configured to control a communication connection of at least one communication element or function in at least one second network area which does not provide a specific communication capability or function, the method comprising:

receiving and processing, in case a communication element or function of the at least one communication element or function using the specific communication capability or function enters from a first network area providing the specific communication capability or function into the at least one second network area and switching of the communication connection to the at least one second network area is initiated, a request from a first communication network control element or function configured to control a communication connection of the communication element or function in the first network area to conduct a switched mode for providing service continuity for the communication element with starting a dual or multi connectivity communication, wherein the switched mode involves that:

at least one split or switched bearer is established to the communication element or function with the second communication network control element or function via which the communication element or function communicates with at least one of the first network area or the at least one second network area, and wherein data traffic for the continued service using the specific communication capability or function is transmitted to or from the communication element of function from or to the first communication network control element or function via the second communication network control element or function using the at least one split or switched bearer.

19. The method according to claim 18, further comprising:

when requesting the switched mode, receiving and processing a secondary cell addition preparation request from the first communication network control element or function for setting up a dual or multi connectivity communication with the second communication network control element or function as a secondary cell, receiving, from the first communication network control element or function, and storing configuration information of the communication element or function related to the specific communication capability or function, preparing suitable resources for data traffic transmission via an interface between the first communication network control element or function and the second communication network control element or function, preventing establishing a connection to a user plane function for the specific communication capability of function for avoiding a path switch, confirming the switched mode to the first communication network control element or function, reserving communication resources via a radio interface towards the communication network or function for providing traffic data related to the specific communication capability or function, and serving the data traffic of the communication element or function with forwarding data packets between the communication element or function and a core network via the interface between the first communication network control element or function and the second communication network control element or function.

20. The method according to claim 18, further comprising:

when requesting the switched mode, receiving and processing a handover request from the first communication network control element or function including configuration information of the communication element or function related to the specific communication capability or function, and a request for providing service continuity with using dual or multi connectivity communication, responding, when service continuity can be supported, to the handover request with transmitting a request to the first communication network control element or function to configure a split or switched bearer for service continuity, establishing a split or switched bearer with the communication element or function where the second communication network control element or function acting as a master cell, preparing suitable resources for data traffic transmission via an interface between the first communication network control element or function and the second communication network control element or function, and serving the data traffic of the communication element or function with forwarding data packets between the communication element or function and a core network via the interface between the first communication network control element or function and the second communication network control element or function.

21. The method according to claim 18, further comprising:

receiving and processing information indicating a validity timer indicating a timing when the dual or multi connectivity communication for providing service continuity is to be terminated in the at least one second network area, and terminating the dual or multi connectivity communication with the communication element or function when the timer expires with conducting a handover to the second communication network control element or function.

22. The method according to claim 18, further comprising:

initiating, in case it is determined that the communication element or function enters from the at least one second network area into another network area providing the specific communication capability of function, switching of the communication connection to the other network area, providing configuration information of the communication element or function related to the specific communication capability or function to a communication network control element or function of the other network area, and terminating the switched mode when the switching of the communication connection to the other network area is completed.

23. The method according to claim 22, further comprising receiving, from the first communication network control element or function, and processing a communication capability search mode indication for informing the second communication network control element or function to set the communication element or function into a communication capability search mode in which a further switching of the communication connection to another network area providing the specific communication capability or function is accelerated.

24. The method according to claim 18, wherein the switched mode involves that the first communication network control element or function of the first network area is set as a master cell group and one second communication network control element or function of the at least one second network area is set as a secondary cell group, or that one second communication network control element or function of the at least one second network area is set as a master cell group and the first communication network control element or function of first network area and other second communication network control elements or functions are set as a secondary cell group.

* * * * *